US012801931B2

(12) United States Patent
Ye et al.

(10) Patent No.: US 12,801,931 B2
(45) Date of Patent: Nov. 17, 2026

(54) MODEL ADJUSTMENT METHOD AND APPARATUS BASED ON CONVERGENCE SUPER-MODEL, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Zhiling Ye, Shenzhen (CN); Han Kong, Shenzhen (CN); Yingpai Song, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 593 days.

(21) Appl. No.: 18/455,717

(22) Filed: Aug. 25, 2023

(65) Prior Publication Data

US 2023/0401450 A1 Dec. 14, 2023

Related U.S. Application Data

(63) Continuation of application No. PCT/CN2022/134391, filed on Nov. 25, 2022.

(30) Foreign Application Priority Data

Feb. 24, 2022 (CN) ......................... 202210171877.1

(51) Int. Cl.

*G06F 21/00* (2013.01)
*G06N 3/0464* (2023.01)
*G06N 3/096* (2023.01)

(52) U.S. Cl.

CPC ........... *G06N 3/096* (2023.01); *G06N 3/0464* (2023.01)

(58) Field of Classification Search

None
See application file for complete search history.

(56) References Cited

U.S. PATENT DOCUMENTS

2021/0334440 A1 10/2021 Yamashina et al.
2021/0383223 A1 12/2021 Tan et al.
(Continued)

FOREIGN PATENT DOCUMENTS

CN 111563592 A 8/2020
CN 111582452 A 8/2020
(Continued)

OTHER PUBLICATIONS

The World Intellectual Property Organization (WIPO) International Search Report for PCT/CN2022/134391 Jan. 28, 2023 6 Pages (including translation).
(Continued)

*Primary Examiner* — William J. Goodchild
(74) *Attorney, Agent, or Firm* — ANOVA LAW GROUP, PLLC

(57) ABSTRACT

A model adjustment method includes: encapsulating a model operator in a project model to obtain a super-model corresponding to the project model, the model operator at least including: a network layer in the project model, the super-model being a model with a dynamically variable space structure; determining a configuration search space corresponding to the project model according to the model operator and a control parameter; training the super-model based on the configuration search space and the project model and obtaining a convergence super-model corresponding to the project model in response to that a training end condition is reached; and searching the convergence super-model for an adjusted model corresponding to the project model.

19 Claims, 12 Drawing Sheets

(56) References Cited

U.S. PATENT DOCUMENTS

| | | | | |
|---|---|---|---|---|
| 2023/0028237 | A1 | 1/2023 | Wei et al. | |
| 2023/0082597 | A1 * | 3/2023 | Lin | G06N 3/0464 706/27 |
| 2023/0089380 | A1 | 3/2023 | Jiang et al. | |
| 2023/0401450 | A1 | 12/2023 | Ye et al. | |

FOREIGN PATENT DOCUMENTS

| | | | |
|---|---|---|---|
| CN | 111931906 | A | 11/2020 |
| CN | 112380319 | A | 2/2021 |
| CN | 112906853 | A | 6/2021 |
| CN | 113361697 | A | 9/2021 |
| CN | 113409299 | A | 9/2021 |
| CN | 113570045 | A | 10/2021 |
| CN | 113704082 | A | 11/2021 |
| CN | 114492765 | A | 5/2022 |
| CN | 110807515 | B | 4/2023 |
| CN | 110909877 | B | 10/2023 |
| WO | 2021164752 | A1 | 8/2021 |
| WO | 2021190451 | A1 | 9/2021 |
| WO | 2021233342 | A1 | 11/2021 |
| WO | 2021238366 | A1 | 12/2021 |

OTHER PUBLICATIONS

The State Intellectual Property Office of the People's Republic of China (SIPO) Office Action 1 for 202210171877.1 Jun. 19, 2024 9 Pages (including translation).

* cited by examiner

MODEL ADJUSTMENT METHOD AND APPARATUS BASED ON CONVERGENCE SUPER-MODEL, ELECTRONIC DEVICE, AND COMPUTER-READABLE STORAGE MEDIUM

RELATED APPLICATIONS

This application is a continuation application of PCT/CN2022/134391 filed on Nov. 25, 2022, which claims priority to Chinese Patent Application No. 202210171877.1, filed on Feb. 24, 2022, all of which are incorporated by reference in entirety.

FIELD OF THE TECHNOLOGY

The present disclosure relates to an artificial intelligence (AI) technology, and in particular, to a model adjustment method and apparatus, an electronic device, a computer-readable storage medium, and a computer program product.

BACKGROUND

A deep learning (DL) model, due to its feature extraction and feature generalization ability, is often used as a core supporting technology and applied to various AI scenes. In order to make the DL model have a better prediction effect or efficiency, the trained DL model is usually adjusted, and the adjusted DL model is deployed to an implementation scene.

However, in certain existing technology, optional models during model adjustment may be obtained by consuming a great number of computing resources, thereby consuming more computing resources (such as memory and threads) for model adjustment. Moreover, additional model trainings are desired when facing different service desirables in certain existing technology, thereby reducing the efficiency of model adjustment.

SUMMARY

The present disclosure in various aspects provide a model adjustment method and apparatus, an electronic device, a computer-readable storage medium, and a computer program product, which may be applied to various scenes such as cloud technology, artificial intelligence (AI), intelligent transportation, vehicles, and relate to an AI technology.

In one aspect, the present disclosure provides a model adjustment method, including: encapsulating a model operator in a project model to obtain a super-model corresponding to the project model, the model operator at least including: a network layer in the project model, the super-model being a model with a dynamically variable space structure; determining a configuration search space corresponding to the project model according to the model operator and a control parameter; training the super-model based on the configuration search space and the project model and obtaining a convergence super-model corresponding to the project model in response to that a training end condition is reached; and searching the convergence super-model for an adjusted model corresponding to the project model.

In certain embodiment(s), the project model is referred to as a to-be-adjusted model.

In certain embodiment(s), model adjustment includes model optimization.

In another aspect, the present disclosure provides a model adjustment apparatus, including: a memory storing computer program instructions; and a processor coupled to the memory and configured to execute the computer program instructions and perform: encapsulating a model operator in a project model to obtain a super-model corresponding to the project model, the model operator at least including: a network layer in the project model, the super-model being a model with a dynamically variable space structure; determining a configuration search space corresponding to the project model according to the model operator and a control parameter; training the super-model based on the configuration search space and the project model and obtaining a convergence super-model corresponding to the project model in response to that a training end condition is reached; and searching the convergence super-model for an adjusted model corresponding to the project model.

In yet another aspect, the present disclosure provides an electronic device for model adjustment, including: a memory, configured to store executable instructions; and a processor, configured to implement, when executing the executable instructions stored in the memory, the model adjustment method provided according to certain embodiment(s) of the present disclosure.

In yet another aspect, the present disclosure provides a non-transitory computer-readable storage medium storing executable instructions for implementing, when executed by a processor, the model adjustment method provided in this embodiment of the present disclosure.

The present disclosure in certain embodiment(s) has the following beneficial effects. An electronic device obtains a super-model that has a dynamically variable space structure and may provide models with different structures by encapsulating a model operator, and trains the super-model by configuring a search space and a project model, thereby obtaining, by only one training, a convergent super-model available for searching for a model with better performance, reducing model trainings for generating optional models, and also reducing computing resources consumed during model adjustment. Also, in view of different service desirables, only a corresponding adjusted model may be extracted directly from the convergence super-model, and additional model trainings are not desired, thereby improving the efficiency of model adjustment. In addition, the project model in a service scene is replaced with an adjusted model, thereby improving the processing performance for the service scene.

Other aspects of the present disclosure may be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
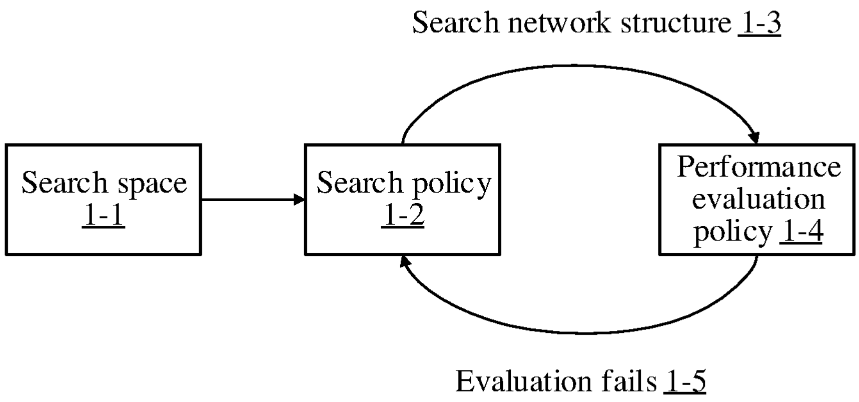
FIG. 1 is a schematic flowchart of model structure search.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of embodiments. When and as applicable, the term "an embodiment," "one embodiment," "some embodiment(s), "some embodiments," "certain embodiment(s)," or "certain embodiments" may refer to the same subset or different subsets of embodiments, and may be combined with each other without conflict.

In certain embodiments, the term "based on" is employed herein interchangeably with the term "according to."

The term "first/second" involved in the following description is only for distinguishing between similar objects and does not represent a particular sequence of the objects. It is to be understood that "first/second" may be interchanged to particular sequences or orders if allowed to implement the embodiments of the present disclosure described herein in sequences other than that illustrated or described herein.

Unless otherwise defined, meanings of all technical and scientific terms used in the present disclosure are the same as those usually understood by a person skilled in the art to which the present disclosure belongs. The terms used in the present disclosure are for the purpose of describing the embodiments of the present disclosure only and are not intended to be limiting of the present disclosure.

Before the embodiments of the present disclosure are further described in detail, a description is made on nouns and terms in the embodiments of the present disclosure, and the nouns and terms in the embodiments of the present disclosure are applicable to the following explanations.

1) AI is a theory, method, technology, and implementation system that utilizes a digital computer or a machine controlled by the digital computer to simulate, extend, and expand human intelligence, perceive the environment, obtain knowledge, and use the knowledge to obtain optimal results. In other words, AI is a comprehensive technology in computer science and attempts to understand the essence of intelligence and produce a new intelligent machine that may react in a manner similar to human intelligence. AI is to study the design principles and implementation methods of various intelligent machines, to enable the machines to have the functions of perception, reasoning, and decision-making.

An AI technology is a comprehensive discipline, and relates to a wide range of fields including both hardware-level technologies and software-level technologies. AI technologies generally include technologies such as a sensor, a dedicated AI chip, cloud computing, distributed storage, a big data processing technology, an operating/interaction system, and electromechanical integration. AI software technologies include several directions such as a computer vision technology, a speech processing technology, a natural language processing technology, machine learning (ML)/DL, automatic driving, and intelligent transportation. The embodiments of the present disclosure relate to adjustment of a DL model in AI.

In certain embodiment(s), the project model is referred to as a to-be-adjusted model.

In certain embodiment(s), model adjustment includes model optimization.

2) ML is a multi-field discipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a way to make the computer intelligent, and is applied to various fields of AI. ML and DL generally include technologies such as an artificial neural network, a belief network, reinforcement learning, transfer learning, and inductive learning.

3) DL is a research branch of ML. In DL, lower-layer features are combined into a more abstract higher-layer representation or feature by multi-layer processing, so as to implement a distributed feature representation of data. Typical deep learning models include a convolutional neural network (CNN) model, a deep belief nets (DBN) model, a stacked auto-encoder network, and the like.

4) Model adjustment adjusts a trained DL model, whereby a prediction effect of the DL model such as classification accuracy and identification accuracy is improved, or the prediction efficiency of the DL model is improved.

5) Model structure search is a technology of searching a neural network structure and realizing automatic design of the neural network structure. The model structure search may be realized by a search policy. Exemplarily, FIG. 1 is a schematic flowchart of model structure search. Referring to FIG. 1, a network structure 1-3 is first searched from a search space 1-1 according to a search policy 1-2, and the network structure is evaluated using a performance evaluation policy 1-4. When evaluation fails 1-5, the network structure is searched in the search space 1-1 again according to the search policy 1-2.

6) Model parameter compression is a technology of miniaturizing the DL model while keeping the prediction effect of the model as much as possible. That is to say, through model parameter compression, the parameters and the amount of computation of the DL model may be reduced, the reasoning speed of the DL model may be improved, and the reasoning cost of the DL model may be reduced without losing the prediction effect of the DL model. The DL model without model parameter compression may consume a great number of computing and memory resources. If the DL model is applied to service scenes, the parameters of the DL model may be reduced by model parameter compression in order not to affect the use experience.

7) A search space is a set of neural network structures available for searching, namely a defined optional model range during model adjustment.

8) A search policy is how to find the best model policy in the search space during model adjustment.

9) A performance evaluation policy is a policy for evaluating the performance of the searched model.

With the research and progress of the AI technology, the AI technology is researched and applied in many fields, such as common smart home, intelligent wearable devices, virtual assistants, intelligent speakers, intelligent marketing, unmanned driving, automatic driving, unmanned aerial vehicles, robots, intelligent medical, intelligent customer service, Internet of vehicles, automatic driving, and intelligent transportation. It is believed that with the development of technology, the AI technology will be applied in more fields and plays an increasingly important value.

The DL model, because of excellent feature extraction and feature generalization ability, is often used as a core supporting technology and applied to various AI scenes. In order to make the DL model have a better prediction effect or efficiency, the trained DL model is usually adjusted, and the adjusted DL model is deployed to an implementation scene.

In certain existing technology, model adjustment is realized by searching for a model with a better prediction effect or prediction efficiency from optional models, and each model in the optional models is a model that has been trained. Therefore, the optional models may be obtained only after many model training processes in certain existing technology. However, the training process of the model may consume huge computing resources. In this way, optional models during model adjustment may be obtained by consuming a great number of computing resources, thereby consuming more computing resources for model adjustment. For example, adjustment may be performed by consuming more memories and occupying more threads. Moreover, in certain existing technology, according to different service desirables (such as classification and positioning), model structure search and model structure compression are desired respectively. That is, the training process of available models may not be shared according to different desirables, which leads to the desire for additional model trainings and reduces the efficiency of model adjustment.

In addition, in certain existing technology, model adjustment is often designed for specific tasks, for example, compressing a model of a medical image segmentation scene, or searching for an optimal model of quantization bit width, which makes it difficult for model adjustment to be quickly deployed and applied to other scenes, and makes the versatility of model adjustment poor.

An embodiment of the present disclosure provides a model adjustment method and apparatus, an electronic device, a computer-readable storage medium, and a computer program product, which may reduce computing resources consumed during model adjustment and improve the efficiency of model adjustment. An exemplary implementation of an electronic device provided in this embodiment of the present disclosure is described below. The electronic device provided in this embodiment of the present disclosure may be implemented as various types of terminals such as a laptop computer, a tablet computer, a desktop computer, a set-top box, and a mobile device, and may also be implemented as a server. The exemplary implementation of the electronic device implemented as a server will be described below.

Figure 2:
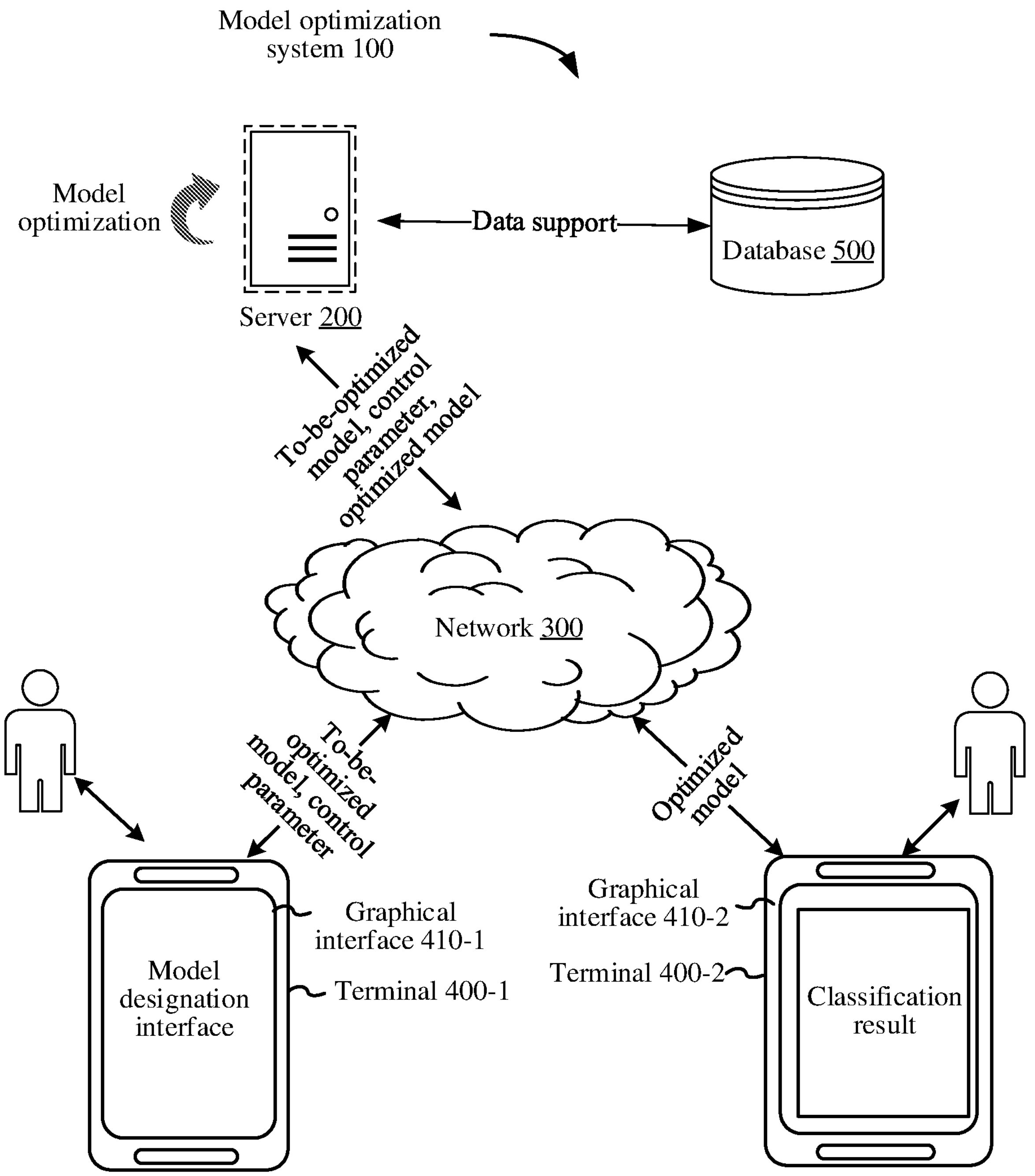
FIG. 2 is a schematic architectural diagram of a model adjustment system according to certain embodiment(s) of the present disclosure.

Reference is made to FIG. 2. FIG. 2 is a schematic architectural diagram of a model adjustment system according to an embodiment of the present disclosure. In order to support a model adjustment application, a terminal (exemplarily, a terminal 400-1 and a terminal 400-2) is connected to a server 200 through a network 300 in a model adjustment system 100. The network 300 may be a wide area network or a local area network, or a combination of both. In the model adjustment system 100, a database 500 is also provided to provide data support to the server 200. The database 500 may be independent of the server 200 or may be configured in the server 200. FIG. 1 shows a scenario in which the database 500 is independent of the server 200.

The terminal 400-1 is configured to obtain a project model and a control parameter in response to an input operation in a model designation interface of a graphical interface 410-1, and transmits the project model and the control parameter to the server 200 through the network 300.

In certain embodiment(s), the project model is referred to as a to-be-adjusted model.

The server 200 is configured to: encapsulate a model operator in the project model to obtain a super-model corresponding to the project model, the model operator at least including: a network layer in the project model, the super-model being a model with a dynamically variable space structure; determine a configuration search space corresponding to the project model according to the model operator and a control parameter; train the super-model based on the configuration search space and the project model and obtain a convergence super-model in response to that a training end condition is reached; and search the convergence super-model for an adjusted model corresponding to the project model, perform model adjustment, and transmit the adjusted model obtained to the terminal 400-2.

The terminal 400-2 is configured to invoke the adjusted model to classify designated images in response to a triggering operation of an image classification interface on the graphical interface 410-2, and display a classification result on the graphical interface 410-2.

This embodiment of the present disclosure may be implemented via a cloud technology. The cloud technology refers to a hosting technology, which unifies a series of resources, such as hardware, software, and networks, and realizes the computation, storage, processing, and sharing of data in a wide area network or a local area network.

The cloud technology is a general term of a network technology, an information technology, an integration technology, a management platform technology, and an application technology based on cloud computing business model application. The technology may be used as desired and flexibly and conveniently by composing a resource pool. The cloud computing technology becomes an important support. A background service of a technical network system uses a number of computing and storage resources, and is implemented by cloud computing.

Exemplarily, the server 200 may be an independent physical server, may also be a server cluster or distributed system composed of a plurality of physical servers, and may also be a cloud server providing cloud computing services, such as a cloud service, a cloud database, cloud computing, a cloud function, cloud storage, a network service, cloud communication, a middleware service, a domain name service, a security service, a CDN, and a data and artificial intelligence platform. The terminal 400-1 and the terminal 400-2 may be, but is not limited to, a smartphone, a tablet computer, a laptop computer, a desktop computer, a smart speaker, a smartwatch, a smart appliance, a vehicle-mounted terminal, or the like. The terminal and the server may be directly or indirectly connected in a wired or wireless communication manner. This embodiment of the present disclosure is not limited thereto.

Figure 3:
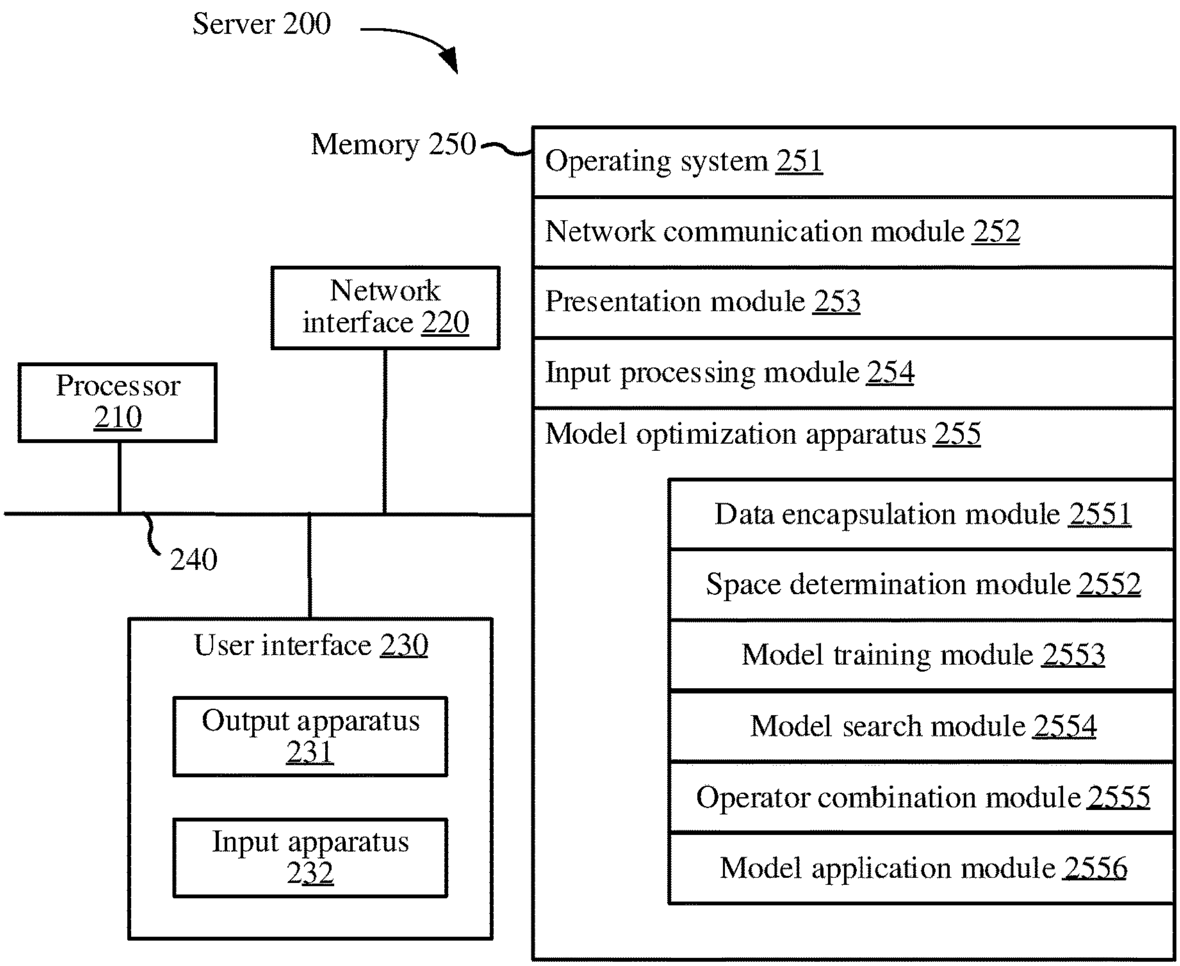
FIG. 3 is a schematic structural diagram of a server in FIG. 1 according to certain embodiment(s) of the present disclosure.

Reference is made to FIG. 3. FIG. 3 is a schematic structural diagram of a server (an implementation of an electronic device) in FIG. 1 according to an embodiment of the present disclosure. The server 200 shown in FIG. 3 includes: at least one processor 210, a memory 250, at least one network interface 220, and a user interface 230. Components in the server 200 are coupled together by using a bus system 240. It is to be understood that, the bus system 240 is configured to implement connection and communication between the components. In addition to a data bus, the bus system 240 further includes a power bus, a control bus, and a state signal bus. However, for ease of clear description, all types of buses in FIG. 3 are marked as the bus system 240.

The processor 210 may be an integrated circuit chip having signal processing capabilities, for example, a general processor, a digital signal processor (DSP), another programmable logic device, discrete gate or transistor logic device, or discrete hardware component, or the like. The general processor may be a microprocessor, any suitable processor, or the like.

The user interface 230 includes one or more output apparatuses 231 that enable the presentation of media content, including one or more speakers and/or one or more visual display screens. The user interface 230 further includes one or more input apparatuses 232, including user interface components that facilitate user input, such as a keyboard, a mouse, a microphone, a touch-screen display, a camera, or another input button and control.

The memory 250 may be removable, non-removable, or a combination thereof. Exemplary hardware devices include solid state memories, hard disk drives, optical disk drives, and the like. The memory 250 includes one or more storage devices physically remote from the processor 210.

The memory 250 includes a volatile memory or a non-volatile memory, or may include both a volatile memory and a non-volatile memory. The non-volatile memory may be a read only memory (ROM), and the volatile memory may be a random access memory (RAM). The memory 250 described in this embodiment of the present disclosure aims to include any suitable type of memory.

In some embodiments, the memory 250 is capable of storing data to support various operations. Examples of the data include programs, modules, and data structures or subsets or supersets thereof, as exemplified below.

An operating system 251 includes a system program for processing various system services and executing hardware-related tasks, such as a framework layer, a core library layer, and a driver layer, for realizing various services and processing hardware-based tasks.

A network communication module 252 is configured to reach other computing devices via one or more (wired or wireless) network interfaces 220. The network interface 220 exemplarily includes: Bluetooth, wireless fidelity (Wi-Fi), and universal serial bus (USB), and the like.

A presentation module 253 is configured to enable presentation of information (for example, a user interface for operating peripherals and displaying content and information) via one or more output apparatuses 231 (for example, a display screen, a speaker, or the like) associated with a user interface 230.

An input processing module 254 is configured to detect one or more user inputs or interactions from one or more input apparatuses 232 and translate the detected inputs or interactions.

In some embodiments, the model adjustment apparatus provided in this embodiment of the present disclosure may be implemented in software. FIG. 3 shows a model adjustment apparatus 255 stored in a memory 250, which may be software in the form of a program and a plug-in. The apparatus includes the following software modules: a data encapsulation module 2551, a space determination module 2552, a model training module 2553, a model search module 2554, an operator combination module 2555, and a model application module 2556. These modules are logical and thus may be combined in different ways or further split depending on the functions implemented. The functions of the individual modules will be described below.

In some embodiments, the server or the terminal (possible implementations of an electronic device) may implement the model adjustment method provided in this embodiment of the present disclosure by executing a computer program. For example, the computer program may be a native program or a software module in an operating system. The computer program may also be a native application (APP), namely a program executable after being installed in the operating system, such as a model adjustment APP. The computer program may also be a mini program, namely a program executable after being downloaded in a browser environment. The computer program may also be a mini program embeddable into any APP. In general, the computer program may be any form of application, module, or plug-in.

This embodiment of the present disclosure may be applied to various scenes such as cloud technology, AI, intelligent transportation, and vehicles. The model adjustment method provided in this embodiment of the present disclosure will be described below in connection with exemplary implementations of the electronic device provided in this embodiment of the present disclosure.

Figure 4:
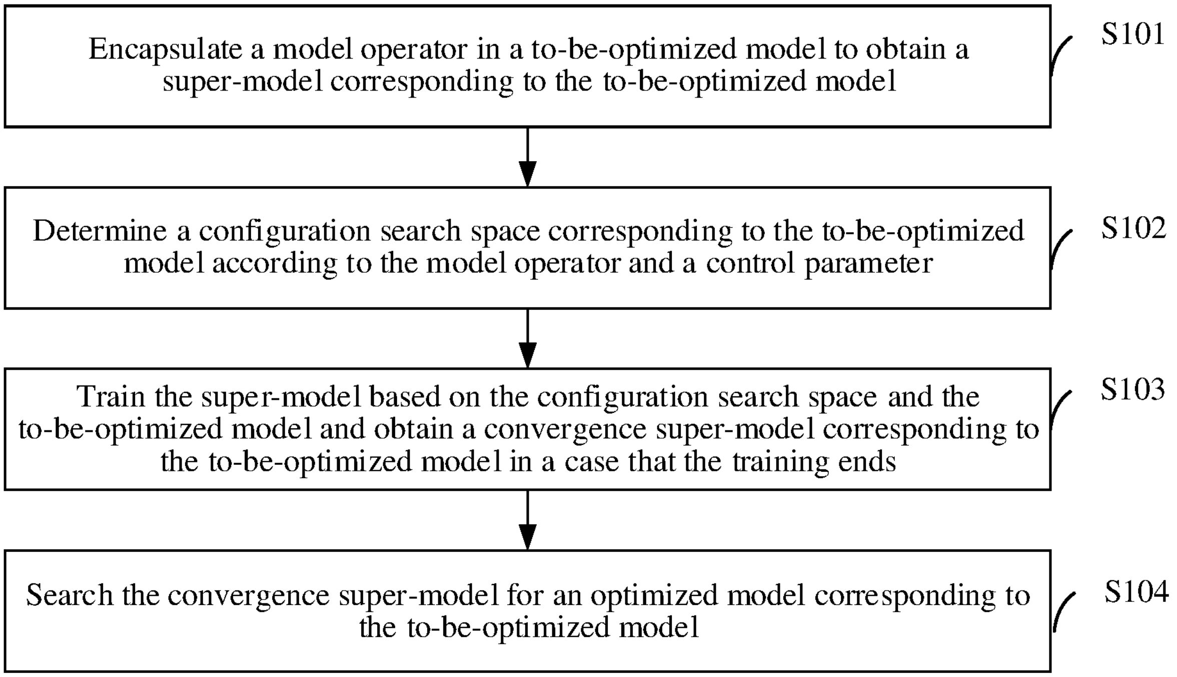
FIG. 4 is a schematic flowchart of a model adjustment method according to certain embodiment(s) of the present disclosure.

Reference is made to FIG. 4. FIG. 4 is a schematic flowchart of a model adjustment method according to an embodiment of the present disclosure. The method is described with steps shown in FIG. 4.

S101: Encapsulate a model operator in a project model to obtain a super-model corresponding to the project model.

In certain embodiment(s), to achieve encapsulation, the model operator may be packaged or included into the project model to obtain the super-model.

This embodiment of the present disclosure is implemented in a scene where a trained model is adjusted. For example, a trained image classification model is compressed structurally. Alternatively, this embodiment of the present disclosure is implemented in a scene where a model with a better prediction effect is searched for the trained image classification model. In this embodiment of the present disclosure, the electronic device may initiate the model adjustment process in response to operating instructions from technicians, or by timing. When the model adjustment process is initiated, the electronic device will first obtain a DL model waiting for adjustment, that is, obtain a project model and obtain a control parameter at the same time. The electronic device encapsulates each model operator in the project model. A space structure of the encapsulated operator is dynamically variable, and a space structure of a model obtained by connecting the encapsulated operator is also dynamically variable. The model is a super-model corresponding to the project model. That is, the super-model in this embodiment of the present disclosure is the model with the dynamically variable space structure.

The electronic device may replace at least one of a channel number, width and height of the model operator with an unknown encapsulation variable, or fuse the unknown encapsulation variable with at least one of the channel number, width and height of the model operator to realize encapsulation of the model operator, whereby at least one of the channel number, width and height of the model operator varies from an original fixed value to a value that varies dynamically with the variation of the variable (it may also be understood that the shape of the model operator varies dynamically). Therefore, the space structure of the super-model formed by using the encapsulated model operator is dynamically variable and may be visualized into different sub-models according to different values of at least one of the channel number, width and height. The dynamic variation range of at least one of the channel number, width and height of the model operator corresponds to the value range of the encapsulation variable.

The project model is a trained model. That is, the project model is a DL model that has been designed and trained for service scenes. The project model may be a CNN model, an artificial neural network model, a recurrent neural network model, or the like. This embodiment of the present disclosure is not limited thereto.

It is to be understood that the control parameter is a super-parameter for determining a configuration search space corresponding to the project model. The control parameter may be designated by technicians or automatically generated by the electronic device according to the structure of the project model. For example, the ratio of a minimum channel number to a maximum channel number in the project model is determined as the control parameter, or the ratio of a channel number of each network layer to the sum of channel numbers is determined as the control parameter. In some embodiments, the control parameter may further include a plurality of sub-model parameters.

The model operator is a network structure with functions in the project model, such as a convolution layer, a pooling layer, and another network layer (a single neuron in the network layer may not have functions, and is thus not the model operator). In certain embodiment(s), in some embodiments, the model operator may also be a functional unit obtained by connecting a plurality of network layers, such as a feature encoder formed by connecting embedding layers, convolution layers, and the like. At this moment, the feature encoder is a model operator. That is to say, in this embodiment of the present disclosure, the model operator at least includes: a network layer in the project model.

S102: Determine a configuration search space corresponding to the project model according to the model operator and a control parameter.

According to the model operator and the control parameter in the project model, the electronic device first determines variations for each model operator in the project model, and expresses the variations for each model operator using a configuration parameter to obtain a configuration parameter range that may be selected by each model operator. By concentrating the configuration parameter ranges into the same search space (for example, a vector space), the configuration search space of the project model may be obtained.

The operation of determining a configuration search space includes: determining a specific optional value for an unknown encapsulation variable corresponding to each model operator, whereby the encapsulated model operators may be visualized as variant operators (the variant operators refer to variants of the model operators, which have fixed space structures different from the space structures of the model operators) in the subsequent training process, thereby visualizing the super-models as sub-models.

Exemplarily, when the project model has three model operators, namely Conv1, Conv2, and Conv3, channel numbers thereof are Channel 1, Channel 2, and Channel 3. The electronic device encapsulates the three model operators, the channel numbers of the three model operators may be fused with unknown encapsulation variables to obtain Super1Channel 1, Super2Channel 2, and Super3Channel 3, and the configuration search space is used for designating specific optional proportion ranges for Super1, Super2, and Super3. For example, an optional range for Super1 is [0.1, 0.5], an optional range for Super2 is [0.8, 1], an optional range for Super3 is [0.6, 1.0], and so on. Thus, by sampling the configuration search space, the channel number configuration of each model operator of the visualized sub-model may be determined, thereby specifying the configuration of the sub-model.

It is to be understood that the sequence of execution of S101 and S102 does not affect the training of the super-model. Thus, in some embodiments, the electronic device may also perform S102 and S101, or simultaneously perform S101 and S102. This embodiment of the present disclosure is not limited thereto.

S103: Train the super-model based on the configuration search space and the project model and obtain a convergence super-model corresponding to the project model in response to that the training ends.

After obtaining the configuration search space and the super-model, the electronic device will train the super-model according to the configuration search space and the project model simultaneously, whereby the model parameter of the super-model converges until the training end condition is reached. For example, when the number of iterations reaches a certain degree, or the accuracy of a plurality of sub-models obtained by sampling the super-model reaches a certain degree, the convergence super-model is obtained.

The training of the electronic device for the super-model includes training for a model set derived from the project model. In this way, only one training is desired to obtain the convergence super-model for selecting a model with a better prediction effect or prediction efficiency than the original project model, whereby it is unnecessary to train all the optional models separately, and computing resources consumed during model training are reduced.

In some embodiments of the present disclosure, the electronic device may extract specific sub-models from the super-model through channel configuration parameters sampled from the configuration search space, and determine a set of sub-models obtained as the convergence super-model through knowledge distillation of the project model during an iteration of training to constrain parameter updates of different sub-models until the number of iterations is reached.

In other embodiments of the present disclosure, the electronic device may first determine a variant of each model operator from the super-model according to the configuration search space, use the variant of each model operator to successively replace each model operator in the project model (only one variant is replaced at a time), so as to fine-tune the project model to which the variant of the model operator is added again, to obtain the trained variant of the model operator, and determine a set of sub-models generated using the trained variant as the convergence super-model.

S104: Search the convergence super-model for an adjusted model corresponding to the project model.

After obtaining the convergence super-model, the electronic device may search the convergence super-model for a sub-model with the highest prediction effect and prediction efficiency as an adjusted model according to a given restriction condition or a given index standard, or through random selection, or search for a sub-model satisfying the conditions of the service scene as an adjusted model. At this point, the model adjustment process for the project model is performed. The adjusted model may replace the project model and be applied to the service scene corresponding to the project model. For example, when the project model is applied to a super-resolution reconstruction scene, the adjusted model will also be applied to the super-resolution reconstruction scene. When the project model is applied to an image classification scene, the adjusted model will also be applied to the image classification scene.

The adjusted model corresponding to the project model may replace the adjusted model in the service scene corresponding to the project model, thereby obtaining better processing performance for the service processing. For example, when the project model is applied to super-resolution reconstruction, by using the adjusted model corresponding to the project model, the reconstruction effect of super-resolution reconstruction may be improved without reducing the efficiency, or the efficiency of super-resolution reconstruction may be improved without reducing the reconstruction effect.

It is to be understood that compared with certain existing technology, the optional model may only be obtained through multiple model training processes, whereby more computing resources are consumed by model adjustment, and the training process of available models may not be shared according to different desirables, which leads to the problem of reducing the efficiency of model adjustment. In this embodiment of the present disclosure, an electronic device obtains a super-model that has a dynamically variable space structure and may provide models with different structures by encapsulating a model operator, and trains the super-model by configuring a search space and a project model, thereby obtaining, by only one training, a convergent super-model available for searching for a model with better performance, reducing model trainings for generating an optional model, and also reducing computing resources consumed during model adjustment. Also, in view of different service desirables, only a corresponding adjusted model may be extracted directly from the convergence super-model, and additional model trainings are not desired, thereby improving the efficiency of model adjustment. In addition, the project model in a service scene is replaced with an adjusted model, thereby improving the processing performance for the service scene.

Figure 5:
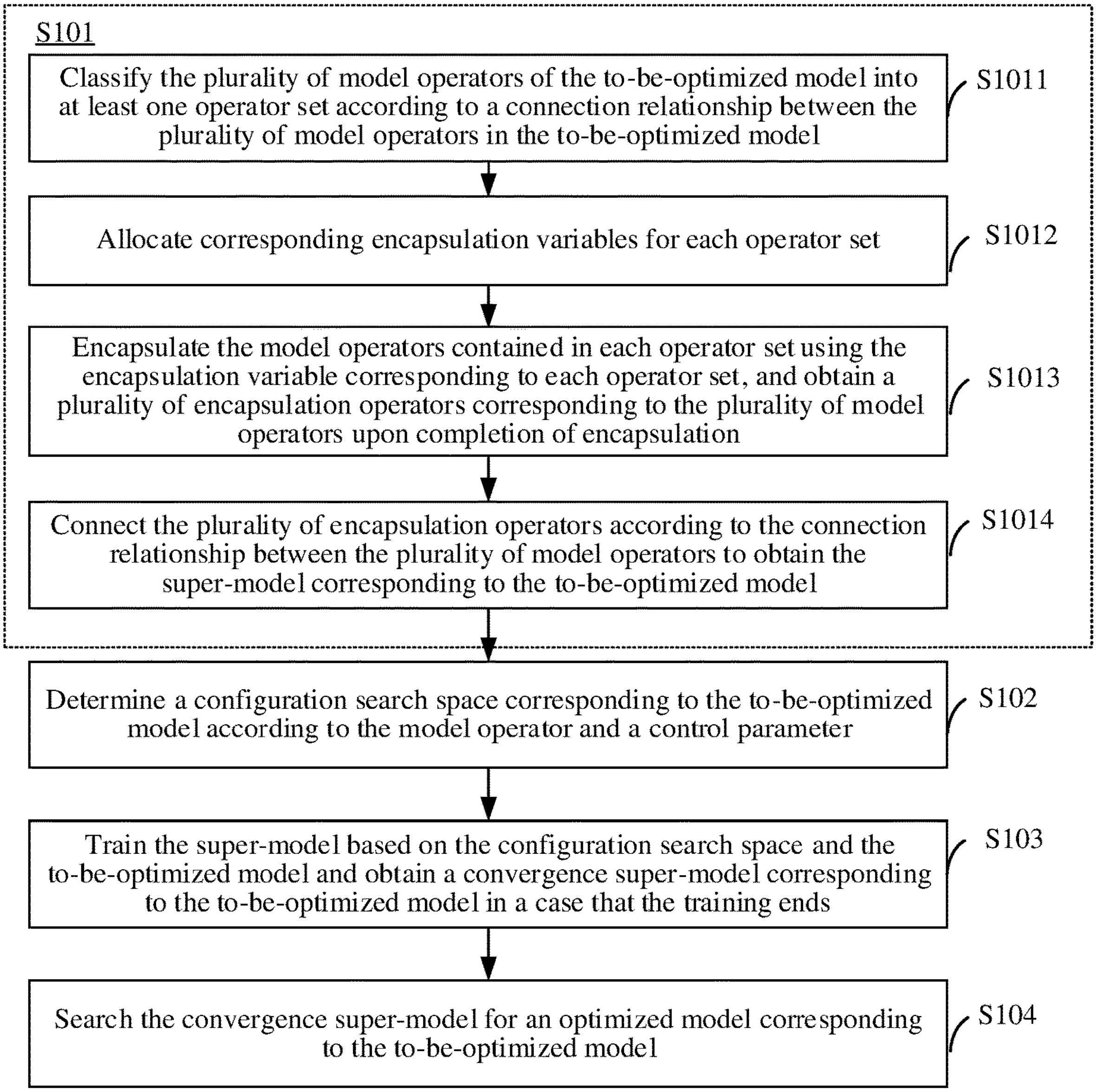
FIG. 5 is another schematic flowchart of a model adjustment method according to certain embodiment(s) of the present disclosure.

Reference is made to FIG. 5 based on FIG. 4. FIG. 5 is another schematic flowchart of a model adjustment method according to an embodiment of the present disclosure. In some embodiments of the present disclosure, the project model includes: a plurality of model operators. The operation of encapsulating a model operator in a project model to obtain a super-model corresponding to the project model, namely the specific implementation process of S101, may include the following S1011-S1014:

S1011: Classify the plurality of model operators of the project model into at least one operator set according to a connection relationship between the plurality of model operators in the project model.

A connection relationship between model operators is a topological structure of the project model. By using the connection relationship between different model operators, the electronic device may determine which model operators have associated space structures, thereby classifying the model operators of which the space structures are desired to remain associated (for example, the same) into the same operator set. The electronic device may obtain at least one operator set after determining the operator set to which each model operator of the project model belongs. It is to be understood that each operator set includes at least one model operator.

S1012: Allocate corresponding encapsulation variables for each operator set.

The electronic device allocates encapsulation variables in the unit of operator sets. In this way, model operators with associated space structures share the same encapsulation variable, thereby ensuring that the subsequent variations of the space structures of the model operators may be consistent.

It is to be understood that the electronic device may select an unknown variable from an unknown variable set as the encapsulation variable, or may obtain the encapsulation variable of each operator set by obtaining characters inputted by technicians for each operator set.

S1013: Encapsulate the model operators contained in each operator set using the encapsulation variable corresponding to each operator set, and obtain a plurality of encapsulation operators corresponding to the plurality of model operators upon completion of encapsulation.

The electronic device uses the encapsulation variables to encapsulate the model operators in the operator set, which means that space structure parameters such as the channel number, height or width of the model operators are blurred using unknown encapsulation variables, and converted from certain values to uncertain and dynamically variable values, whereby the space structures of the encapsulation operators are dynamically variable.

Exemplarily, when the encapsulation variable of an operator set is an unknown quantity x and the channel number (one of the space structure parameters) of the model operators included is 8, the electronic device changes the channel number of the model operators in the operator set to 8x, thereby realizing the encapsulation of the model operators in the operator set.

S1014: Connect the plurality of encapsulation operators according to the connection relationship between the plurality of model operators to obtain the super-model corresponding to the project model.

The electronic device connects a plurality of encapsulation operators according to the order of a plurality of model operators in the project model, and the model obtained is the super-model. The space structure of each encapsulation operator of the super-model is unknown and dynamically variable, and the specific sub-model may be generated subsequently according to the sampled configuration parameter.

It is to be understood that the space structures of the encapsulation operators are dynamically variable. Understandably, the space structure may be transformed within a certain range (the space structure parameter may be valued within a certain range). Therefore, the super-model may also be regarded as a set of models composed of a plurality of model operators with different space structures.

Figure 6:
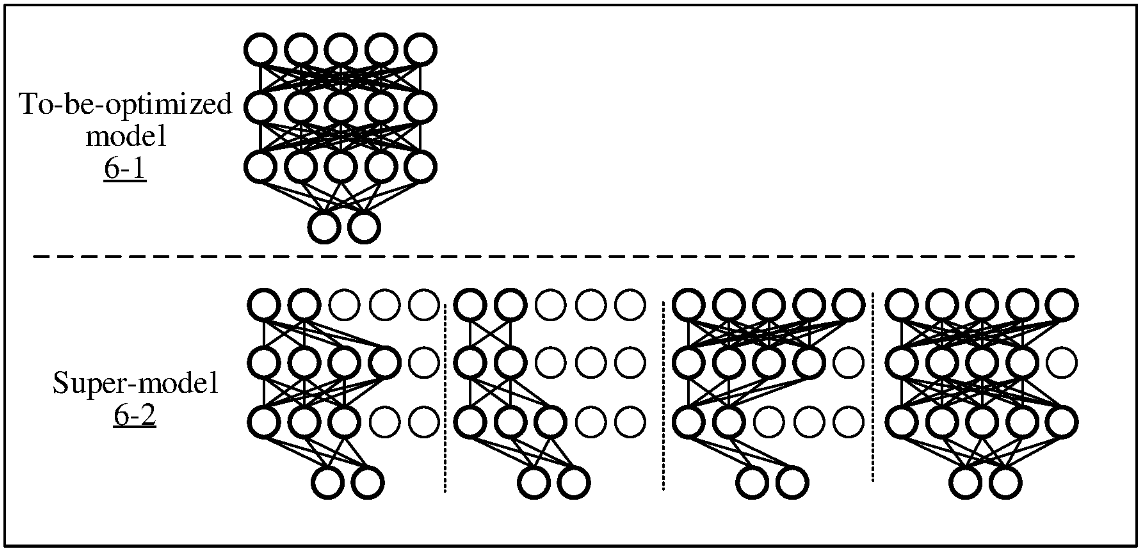
FIG. 6 is a schematic diagram of comparison between a project model and a super-model according to certain embodiment(s) of the present disclosure.

Exemplarily, FIG. 6 is a schematic diagram of comparison between a project model and a super-model according to an embodiment of the present disclosure. A space structure of a project model 6-1 is fixed, and the width (space structure parameter) of each network layer (model operator) has only one value, while a super-model 6-2 may generate different sub-models according to different model configurations, and the width of the same network layer of different sub-models is different. It may be seen that the space structure of the super-model is dynamically variable.

In this embodiment of the present disclosure, the electronic device may classify the model operators into sets according to the connection relationship between the model operators, and determine the same encapsulation variable according to the model operators in the same set, so as to ensure that the space structures of the model operators in the same set have the same transformation subsequently, so as to control a super-model size, namely the size of a model set composed of model operators with different space structures, whereby time desired for searching an adjusted model is in a controllable range.

In some embodiments of the present disclosure, the operation of classifying the plurality of model operators of the project model into at least one operator set according to a connection relationship between the plurality of model operators in the project model, namely the specific process of S1011, may be implemented by the following steps: determining an output operator corresponding to each model operator according to the connection relationship between the plurality of model operators in the project model; and performing, according to the output operators, set classification on the plurality of model operators of the project model to obtain at least one operator set.

In this embodiment of the present disclosure, input data of the output operators is output data of the model operators. The electronic device analyzes the connection relationship between different model operators to determine a next-stage model operator following each model operator. The next-stage model operator is the output operator.

In response to that the project model is a residual network, there will be a jumping structure in the project model, whereby the electronic device may determine a plurality of corresponding output operators for some model operators.

The electronic device classifies the model operators with the same output operator into the same operator set, and establishes respective operator sets for the model operators without the same output operator (at this moment, elements in the operator set may only be the model operator), whereby the electronic device may determine the operator set to which each model operator belongs, and obtain at least one operator set when completing set classification for all the model operators. That is to say, in this embodiment of the present disclosure, the model operators in the same operator set have the same output operators.

Exemplarily, when the output operators of model operator a are model operator b and model operator d, the output operator of model operator b is model operator c, and the output operator of model operator c is model operator d, the electronic device classifies model operator a and model operator c into the same operator set, and separately creates an operator set for model operator b. In this way, at least one operator set may be obtained.

In this embodiment of the present disclosure, the electronic device may determine the output operator of each model operator according to the connection relationship between the model operators, and group a plurality of model operators by the output operator, so as to determine the corresponding encapsulation variables in the unit of operator sets subsequently, thereby ensuring that the model operators with space structure connection share the same encapsulation variable.

In some embodiments of the present disclosure, the operation of encapsulating the model operators contained in each operator set using the encapsulation variable corresponding to each operator set, namely the specific implementation process of S1013, may include the following S1013*a*:

S1013*a*: Perform the encapsulation of the model operators contained in each operator set by fusing the encapsulation variable corresponding to each operator set and an output channel number of the model operators in each operator set.

When the number of output channels of model operators is included in the space structure parameters, the electronic device fuses the encapsulation variables corresponding to each operator set with the number of output channels of model operators belonging thereto. That is, by blurring the number of output channels of model operators contained in each operator set, the encapsulation operators corresponding to the model operators are realized.

In this embodiment of the present disclosure, the electronic device may encapsulate the number of output channels of the model operators by using the encapsulation variables, whereby the number of output channels of the model operators in each operator set is converted from a fixed value to a dynamic variable, without adjusting the number of neurons contained in the model operators, thereby simplifying the super-model (if the number of neurons in each model operator is also dynamically variable, the number of sub-models contained in the super-model will inevitably increase exponentially), and saving computing resources and storage space desired by the super-model.

Figure 7:
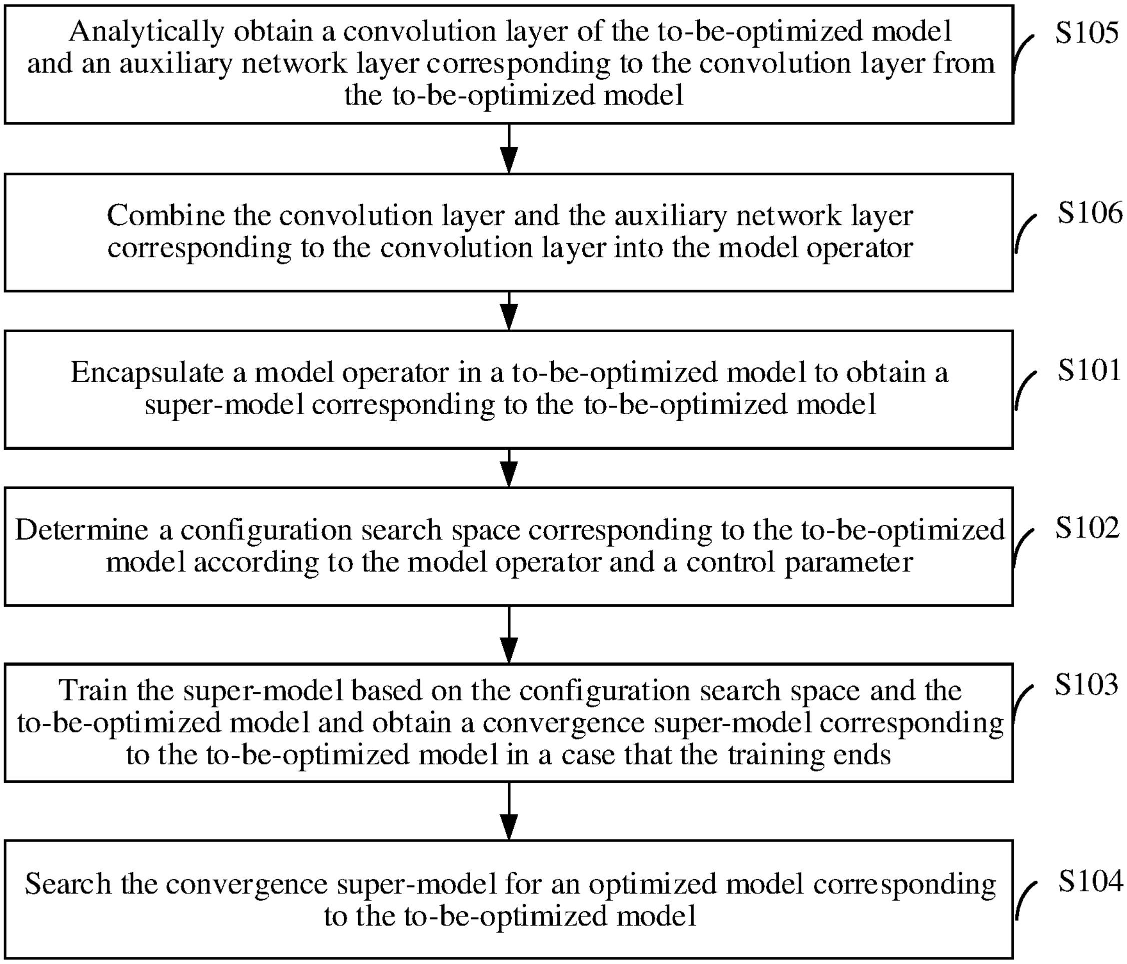
FIG. 7 is yet another schematic flowchart of a model adjustment method according to certain embodiment(s) of the present disclosure.

Reference is made to FIG. 7 based on FIG. 4. FIG. 7 is yet another schematic flowchart of a model adjustment method according to an embodiment of the present disclosure. In some embodiments of the present disclosure, before encapsulating a model operator in a project model to obtain a super-model corresponding to the project model, namely before S101, the method may further include the following S105-S106:

S105: Analytically obtain a convolution layer of the project model and an auxiliary network layer corresponding to the convolution layer from the project model.

Generally speaking, behind a convolution layer in a CNN, network layers such as a pooling layer for dimensionality reduction of output features of the convolution layer and an activation layer for activation processing are also provided.

The network layers are all used for auxiliary processing of the output features of the convolution layer, whereby the pooling layer and the activation layer connected behind each convolution layer may be regarded as auxiliary network layers corresponding to each convolution layer (the convolution layer and the corresponding auxiliary network layers often appear in the CNN as a processing module). The electronic device may first position the convolution layer from the project model, and use another network layer between the convolution layer and a next convolution layer as an auxiliary network layer of the convolution layer, whereby the auxiliary network layer at least includes: a pooling layer and an activation layer.

S106: Combine the convolution layer and the auxiliary network layer corresponding to the convolution layer into the model operator.

The electronic device combines the convolution layer and the auxiliary network layer corresponding to the convolution layer into a model operator, and after the operation is performed for all the convolution layers, a plurality of model operators of the project model may be obtained.

It is to be understood that in this embodiment of the present disclosure, the electronic device classifies the model operators of the project model based on the convolution layer, whereby the classification process of the model operators is simpler and faster, and computing resources are saved.

In some embodiments of the present disclosure, the control parameter includes: a plurality of sub-model configuration parameters. Thus, the operation of determining a configuration search space corresponding to the project model according to the model operator and a control parameter, namely the specific process of S102, may be implemented by: adjusting a space structure parameter of each model operator using the plurality of sub-model configuration parameters to obtain a plurality of updated structure parameters corresponding to each model operator; determining a search space constituted by the plurality of updated structure parameters corresponding to each model operator as a search vector of each model operator; and determining a search space constituted by a plurality of sub-search spaces corresponding to the plurality of model operators as the configuration search space corresponding to the project model.

The electronic device fuses the space structure parameter of each model operator, such as the number of output channels and the number of input channels, with a plurality of sub-model configuration parameters, so as to adjust the space structure parameter of each model operator through the sub-model configuration parameters. It is to be understood that a sub-model configuration parameter will adjust the space structure parameter of each model operator once to obtain an updated structure parameter. Thus, after adjusting the space structure parameter of each model operator using the plurality of sub-model configuration parameters, the electronic device may obtain a plurality of updated structure parameters for each model operator. Next, the electronic device integrates the plurality of updated structural parameters of each model operator into a vector. The vector is a search vector of each model operator. The search vector is used for sampling the configuration parameter of each model operator (for example, a component of a certain dimension of the search vector is used as the configuration parameter). Finally, the electronic device utilizes a plurality of search vectors to form a search space. The search space is the configuration search space corresponding to the project model.

The values of the configuration parameters of the plurality of sub-models are determined before the model adjustment process starts. That is, the configuration parameters of the plurality of sub-models are super-parameters, whereby the control parameter may also be understood as a super-parameter set.

In other embodiments of the present disclosure, after adjusting the space structure parameter of each model operator using a plurality of sub-model configuration parameters to obtain a plurality of updated structure parameters corresponding to each model operator, the electronic device uses the plurality of updated structure parameters for each model operator to form a search matrix (for example, dividing the plurality of updated structure parameters into a plurality of rows and columns for recording), and determines a matrix space constituted by the search matrices obtained by all the model operators as the configuration search space of the project model.

In some embodiments of the present disclosure, the operation of training the super-model based on the configuration search space and the project model and obtaining a convergence super-model corresponding to the project model in response to that a training end condition is reached, namely the specific process of S104, may be implemented by: determining a copy of the project model as a teacher model; performing the following processing by iterating i, $1 \le i \le N$, N being a total number of iterations: sampling the configuration search space for an $i^{th}$ time to obtain $i^{th}$ model configuration information; creating a sub-model corresponding to the $i^{th}$ model configuration information from the super-model; training the sub-model based on the teacher model to obtain a convergence sub-model corresponding to the $i^{th}$ model configuration information; and determining, in response to that i is iterated to N, a set of the convergence sub-models corresponding to the N pieces of model configuration information as the convergence super-model.

The electronic device performs copy processing on the project model to generate a copy of the project model, and the generated copy is used as a teacher model in subsequent training. Thereafter, the electronic device will perform the training of the super-model through iterative processing of i.

When training the super-model, the electronic device will sample once from the configuration search space for each iteration to obtain model configuration information corresponding to this sample. The model configuration information provides space configurations of sub-models that may be created from the super-model, such as the number of output channels and the size of convolution kernels. Next, the electronic device will use the model configuration information to visualize the super-model information. That is, the value of the specific variation of the space structure provided in the model configuration information is used for assigning a value to the encapsulation variable of each encapsulation operator, whereby the encapsulation variable is changed from an unknown quantity to a certain value, and a variant of each model operator may be generated from each encapsulation operator according to the certain value. In this way, a sub-model corresponding to the model configuration information obtained by each sampling may be obtained.

Exemplarily, when the model configuration information indicates that the number of output channels of a certain model operator is 0.25 times of an original channel number, the electronic device assigns a value to the encapsulation variable using 0.25, so as to visualize the encapsulation operator of the model operator to obtain the variant of the model operator. When all the encapsulation operators of the super-model are processed according to the model configuration information, the sub-model corresponding to the model configuration information may be obtained.

The teacher model and the project model have the same model parameter, whereby the electronic device uses the teacher model to train the sub-model. That is, the model parameter of the project model is used as prior information and introduced into the parameter update of the sub-model. In this way, not only the generalization performance of the sub-model may be improved, but also the convergence speed of the sub-model may be improved. The electronic device repeats the sampling and training process until i is iterated to N, and the training end condition is reached.

When the electronic device performs the iteration of i, namely the iteration of i to N, and performs the training of the sub-model corresponding to Nth model configuration information, the convergence sub-models corresponding to the N model configuration information may be used for forming a set, and the set is determined as the convergence super-model. That is to say, the convergence super-model is equivalent to a set of convergence sub-models.

It is to be understood that the number of iterations N may be equal to the size of the configuration search space and may be set by technicians for example to 100 or 50. This embodiment of the present disclosure is not limited thereto.

Figure 8:
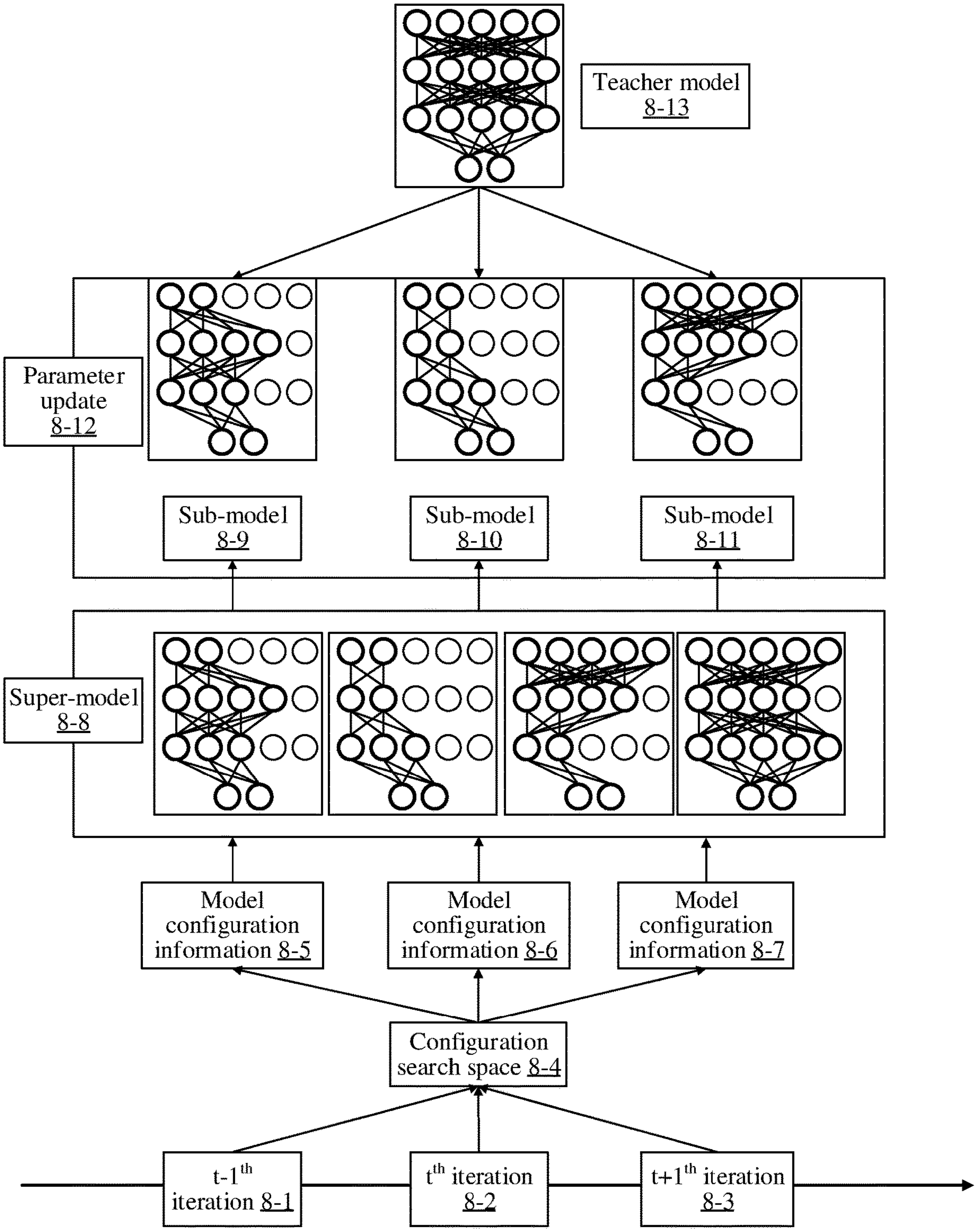
FIG. 8 is a schematic diagram of training a super-model according to certain embodiment(s) of the present disclosure.

Exemplarily, FIG. 8 is a schematic diagram of training a super-model according to an embodiment of the present disclosure. In a $t-1^{th}$ iteration 8-1, a $t^{th}$ iteration 8-2, and a $t+1^{th}$ iteration 8-3, the electronic device samples from a configuration search space 8-4 to obtain model configuration information 8-5 corresponding to the $t-1^{th}$ iteration 8-1, model configuration information 8-6 corresponding to the $t^{th}$ iteration 8-2, and model configuration information 8-7 corresponding to the $t+1^{th}$ iteration 8-3. During the respective processes of the $t-1^{th}$ iteration 8-1, the $t^{th}$ iteration 8-2, and the $t+1^{th}$ iteration 8-3, a sub-model 8-9 corresponding to the $t-1^{th}$ iteration 8-1, a sub-model 8-10 corresponding to the $t^{th}$ iteration 8-2, and a sub-model 8-11 corresponding to the $t+1^{th}$ iteration 8-3 will be generated from a super-model 8-8. Thereafter, in each iteration, the electronic device instructs a parameter update 8-12 process of the sub-model 8-9, the sub-model 8-10, and the sub-model 8-11 using a teacher model 8-13, and determines a set composed of the sub-model 8-9, the sub-model 8-10, and the sub-model 8-11 as a convergence super-model when the $t+1^{th}$ iteration 8-3 is performed.

It is to be understood that the electronic device may create the sub-model through iterative sampling and train the sub-model to perform the training of the super-model, whereby the super-model may be updated only by one training, and the convergence super-model which may be used for model search may be obtained without training different models separately, thereby reducing computing resources consumed during model adjustment. In addition, the teacher model is adopted to increase the convergence speed of the sub-model in each iteration and improve the training efficiency.

In some embodiments of the present disclosure, the operation of training the sub-model based on the teacher model to obtain a convergence sub-model corresponding to the $i^{th}$ model configuration information may be implemented by: determining a training loss value corresponding to the $i^{th}$ model configuration information based on a first prediction result of the sub-model for training data, a second prediction result of the teacher model for the training data, and tag information of the training data; and adjusting a parameter of the sub-model using the training loss value corresponding to the $i^{th}$ model configuration information, and obtaining the convergence sub-model corresponding to the $i^{th}$ model configuration information upon completion of parameter adjustment.

The electronic device inputs the obtained training data into a sub-model corresponding to the $i^{th}$ model configuration information, and determines a prediction result of the sub-model for the training data as the first prediction result. Also, the electronic device inputs the training data into the teacher model, and determines a prediction result outputted by the teacher model as the second prediction result. Next, the electronic device calculates the loss value by using the first prediction result, the second prediction result, and the tag information of the training data. In this way, the training loss value corresponding to the $i^{th}$ model configuration information may be obtained.

Then, the electronic device back-propagates the calculated loss value in the sub-model corresponding to the $i^{th}$ model configuration information, so as to update and adjust the parameter in the sub-model. When the adjustment is performed, the convergence sub-model corresponding to the $i^{th}$ model configuration information may be obtained.

In some embodiments of the present disclosure, the operation of determining a training loss value corresponding to the $i^{th}$ model configuration information based on a first prediction result of the sub-model for training data, a second prediction result of the teacher model for the training data, and tag information of the training data may be implemented by: calculating a first difference value between the first prediction result of the sub-model for the training data and the tag information of the training data; calculating a second difference value between the first prediction result of the sub-model for the training data and the second prediction result of the teacher model for the training data; and determining a fusion result of the first difference information and the second difference information as the training loss value corresponding to the $i^{th}$ model configuration information.

The electronic device may fuse the first difference information and the second difference information by weighted summation, or fuse the first difference information and the second difference information by multiplication, and a fusion result obtained by fusion is a final training loss value.

It is to be understood that when the electronic device weights the first difference information and the second difference information, the weighting weight may be a super-parameter set in advance.

It is to be understood that the electronic device may fuse the second prediction result calculated by the teacher model for the training data into the training loss value, whereby the parameter information of the teacher model is used as prior knowledge during the training of the sub-model by the training loss value, so as to improve the generalization ability and training speed of the sub-model.

In this embodiment of the present disclosure, the electronic device may determine a maximum value in the first difference value and the second difference value as the training loss value in addition to fusing the first difference value and the second difference value to obtain the training loss value. In this way, the sub-model may be trained based on a difference value, whereby the training speed is increased.

In some embodiments of the present disclosure, the operation of searching the convergence super-model for an adjusted model corresponding to the project model, namely the specific process of S104, may be implemented by: screening sub-models in the convergence super-model having a same prediction accuracy as a prediction accuracy of the project model to obtain an initial compressed model; and searching sub-models in the initial compressed model having a prediction speed greater than a prediction speed of the project model for the adjusted model corresponding to the project model.

That is to say, the electronic device first screens out a sub-model having a prediction accuracy at the same level as that of the project model from the convergence super-model as an initial compressed model, searches the initial compressed model for a sub-model having a prediction speed higher than that of the project model, and determines the searched sub-model as the final adjusted model. In this way, the model structure of the project model may be compressed. That is, an adjusted model with the same prediction accuracy but better prediction efficiency may be obtained.

It is to be understood that the initial compressed model may include at least one sub-model having the same prediction accuracy as that of the project model, rather than one sub-model. In certain embodiment(s), the initial compressed model may also be a sub-model, where a difference value between the prediction accuracy of the sub-model and the prediction accuracy of the project model is within a difference range.

In some embodiments of the present disclosure, the operation of searching the convergence super-model for an adjusted model corresponding to the project model, namely the specific process of S104, may also be implemented by: screening sub-models in the convergence super-model having the same prediction speed as the prediction speed of the project model to obtain an initial adjusted model; and searching sub-models in the initial adjusted model having a prediction accuracy greater than a prediction accuracy of the project model for the adjusted model corresponding to the project model.

That is, the electronic device may also screen out a sub-model having a prediction speed at the same level as that of the project model as an initial adjusted model, searches the initial adjusted model for a sub-model having a prediction accuracy higher than that of the project model, and determines the sub-model as the adjusted model. In this way, the model structure of the project model may be searched. That is, an adjusted model with the invariable prediction efficiency but higher prediction accuracy may be obtained.

It is to be understood that the initial adjusted model may include at least one sub-model having the same prediction speed as that of the project model, rather than one sub-model. In certain embodiment(s), the initial adjusted model may also be a sub-model, where a difference value between the prediction speed of the sub-model and the prediction speed of the project model is within a difference range.

It is to be understood that in this embodiment of the present disclosure, the electronic device may search directly the convergence super-model for the adjusted model according to the demands for prediction accuracy and prediction efficiency. Thus, model structure compression and model structure search may be realized based on the same convergence super-model, and model trainings for model structure compression and model structure search are not desired, whereby model adjustment is more versatile and easier to deploy to practical implementation scenes.

In some embodiments of the present disclosure, after searching the convergence super-model for an adjusted model corresponding to the project model, the method may further include: performing, in response to an image reconstruction request transmitted by a terminal device for a to-be-reconstructed image, super-resolution reconstruction on the to-be-reconstructed image using the adjusted model to obtain a super-resolution image of the to-be-reconstructed image, and returning the super-resolution image to the terminal device.

The to-be-reconstructed image is an image with the demand of super-resolution reconstruction, for example, may be an old photo with low resolution, or an image with poor shooting effect and blurred content. The adjusted model is a model for super-resolution reconstruction (at this moment, the convergence super-model is trained for the task of super-resolution reconstruction, whereby the training data is data related to super-resolution reconstruction).

When receiving a to-be-reconstructed image transmitted by a terminal device, the electronic device inputs the to-be-reconstructed image into the adjusted model, and transmits the output of the adjusted model to the terminal device as a super-resolution image (when the electronic device is implemented as a server, the terminal device is an arbitrary terminal for data transmission with the server, and when the electronic device is implemented as a terminal, the terminal device is a terminal other than the terminal at this moment).

It is to be understood that when the prediction speed of the adjusted model is the same as that of the project model, the prediction accuracy is greater than that of the project model, and the to-be-reconstructed image is subjected to super-resolution reconstruction using the adjusted model, the reconstruction efficiency of the adjusted model is not lower than that of the project model, and the reconstruction quality (namely, the image quality of the obtained super-resolution image) is better than that of the project model. When the prediction accuracy of the adjusted model is the same as that of the project model, the prediction efficiency is greater than that of the project model, and the to-be-reconstructed image is subjected to super-resolution reconstruction using the adjusted model, the reconstruction quality of the adjusted model is not lower than that of the project model, and the reconstruction efficiency (namely, the speed of generating the super-resolution image) is higher than that of the project model.

In some embodiments of the present disclosure, after searching the convergence super-model for an adjusted model corresponding to the project model, the method may further include: performing, in response to an image classification request transmitted by a terminal device for a to-be-classified image, image classification on the to-be-classified image using the adjusted model to obtain classification information of the to-be-classified image, and returning the classification information to the terminal device.

The to-be-classified image may be an image captured by the terminal device or downloaded from the network by the terminal device, and the adjusted model is used for image classification. When receiving a to-be-classified image, the electronic device inputs the to-be-classified image into the adjusted model, and transmits the output of the adjusted model to the terminal device as classification information.

It is to be understood that when the prediction speed of the adjusted model is the same as that of the project model, the prediction accuracy is greater than that of the project model, and the to-be-reconstructed image is classified using the adjusted model, the classification efficiency of the adjusted model is not lower than that of the project model, and the classification accuracy is better than that of the project model. When the prediction accuracy of the adjusted model is the same as that of the project model, the prediction efficiency is greater than that of the project model, and the to-be-reconstructed image is classified using the adjusted model, the classification accuracy of the adjusted model is not lower than that of the project model, and the classification efficiency (namely, the speed of generating the super-resolution image) is higher than that of the project model.

An exemplary implementation of this embodiment of the present disclosure in an implementation scene will be described below.

A server of this embodiment of the present disclosure is implemented in a scene where model structure compression and model structure search are performed on a DL model that has been trained. The DL model may be used for image classification or super-resolution reconstruction of an image.

The model structure compression of the DL model (project model) is to reduce, for a given model, reasoning time of the model and obtain a compressed model (adjusted model) while keeping a prediction effect.

Figure 9:
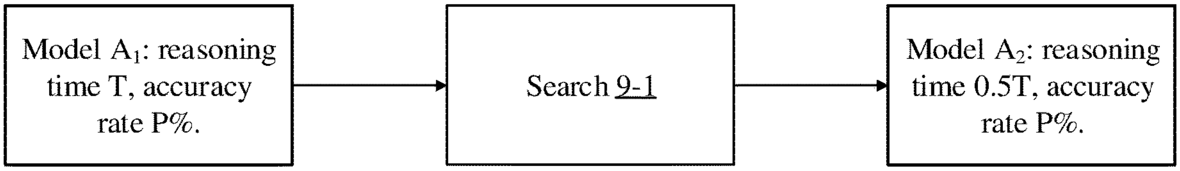
FIG. 9 is a schematic diagram of a process of model structure compression according to certain embodiment(s) of the present disclosure.

FIG. 9 is a schematic diagram of a process of model structure compression according to an embodiment of the present disclosure. Model structure compression refers to searching 9-1 for a new model $A_2$ for a model $A_1$ (which has been trained), where the reasoning time of the model $A_1$ is T and the accuracy rate is P %, and the reasoning time of the model $A_2$ is 0.5T and the accuracy rate is P %.

The model structure compression of the DL model is to reduce, for a given model, the effect of model prediction and obtain a model with better performance (adjusted model) while keeping the reasoning time unchanged.

Figure 10:
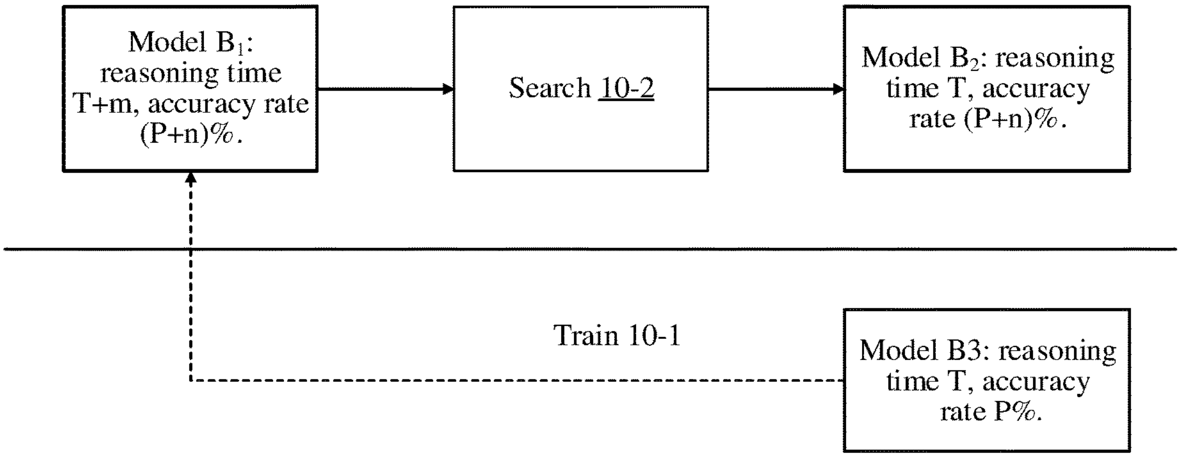
FIG. 10 is a schematic diagram of a process of model structure search according to certain embodiment(s) of the present disclosure.

FIG. 10 is a schematic diagram of a process of model structure search according to an embodiment of the present disclosure. Model structure search is to train 10-1 a larger-scale model $B_1$ for a model $B_3$ to be improved in effect, and search 10-2 $B_1$ for an optimal model $B_2$. The reasoning time of $B_3$ is T and the accuracy rate is P %. $B_1$ The reasoning time is T+m and the accuracy rate is (P+n) %. The reasoning time of $B_2$ is T and the accuracy rate is (P+n) %.

Figure 11:
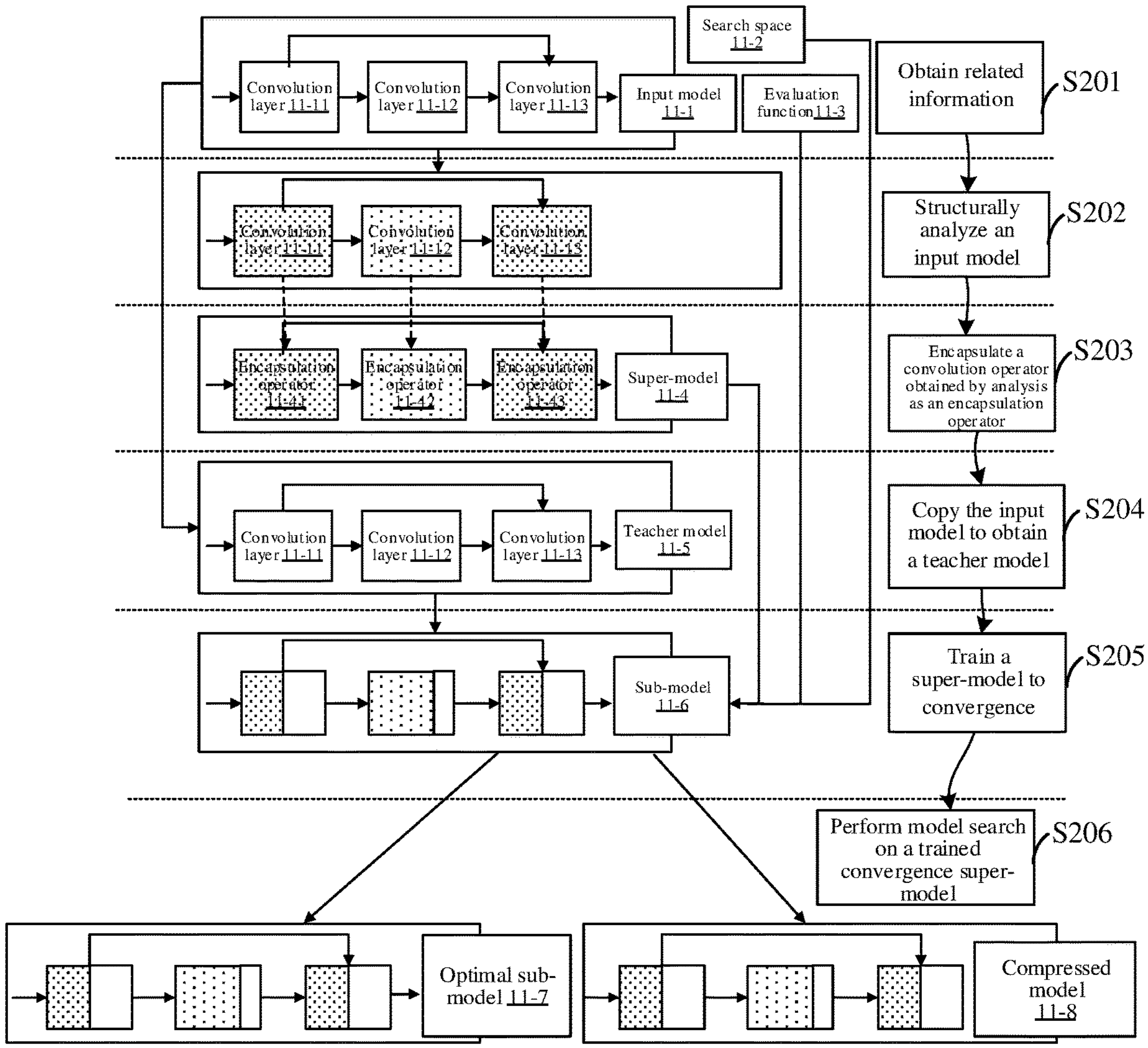
FIG. 11 is a schematic diagram of a process of model structure compression and model structure search according to certain embodiment(s) of the present disclosure.

FIG. 11 is a schematic diagram of a process of model structure compression and model structure search according to an embodiment of the present disclosure. Referring to FIG. 11, the process may include the following steps:

S201: Obtain related information. The related information includes: an input model 11-1 (including three convolution layers: a convolution layer 11-11 to a convolution layer 11-13), a search space 11-2, and an evaluation function 11-3.

It is assumed that the input model is $M_w$ (project model), where W is a set of learnable parameters of the model M, $W=\{w_i\}_{i=1, \ldots, l}$, l is the number of convolution layers (model operators) of the input model $M_w$, $w_i \in R^{out_i \times in_i \times k_i \times k_i}$ is a parameter tensor of an ith convolution layer, $out_i$ and $in_i$ are the number of output channels and the number of input channels of the ith convolution layer, respectively, and $k_i$ is the size of a convolution kernel. The input model $M_w$ is a model that has been trained and is waiting to be adjusted or compressed, may be a model of a classification task, or a model of a super-resolution reconstruction task.

A search space (configuration search space) is determined according to a manually-set configuration super-parameter set (control parameter) and the channel number of the convolution layer (space structure parameter of model operator). The search space is represented as $S=\{s_i\}_{i=1, \ldots n}$, and n is the size of the search space. For each configuration in the search space, $$s_i = \{s_i^1, s_i^2, \ldots, s_i^{l-1}, s_i^l\} \in R^l, \text{ and } s_i^j \in [a_1\,\%\ \mathrm{out}_j, \ldots, a_m\,\%\ \mathrm{out}_j]$$

(search vector of a $j^{th}$ convolution layer). Here, $s_i$ may be understood as an l-dimensional integer vector corresponding to the number of convolution layers. Generally speaking, due to the influence of a topological structure of a DL model, the length of $s_i$ may be less than l. In the search space S, space that may be selected by a $j^{th}$ element (namely, the $j^{th}$ convolution layer) of an $i^{th}$ configuration $s_i$ depends on the super-parameter set $A=[a_1\%, \ldots, a_m\%]$ (a plurality of sub-model configuration parameters) that is considered to be set, and therefore, the size of the search space S is $n=m^l$. $s_i$ is a configuration combination of sub-models that may be adopted after the input model is encapsulated into a super-model, where each element corresponds to a related set of output channels of convolution layer parameters, such as $s^i \in \{0.25out_i, 0.5out_i, 0.75out_i, out_i\}$ (a plurality of updated structure parameters).

A performance evaluation function is formed by, for example, designating a classification accuracy and a corresponding test set for a classification task according to different evaluation methods designated by different tasks. The evaluation function is used for evaluating the effect of sub-models generated from the super-model.

S202: Structurally analyzing an input model.

The DL model and the input model usually have a certain topological structure, where there may be connections between two non-adjacent convolution layers.

Figure 12:
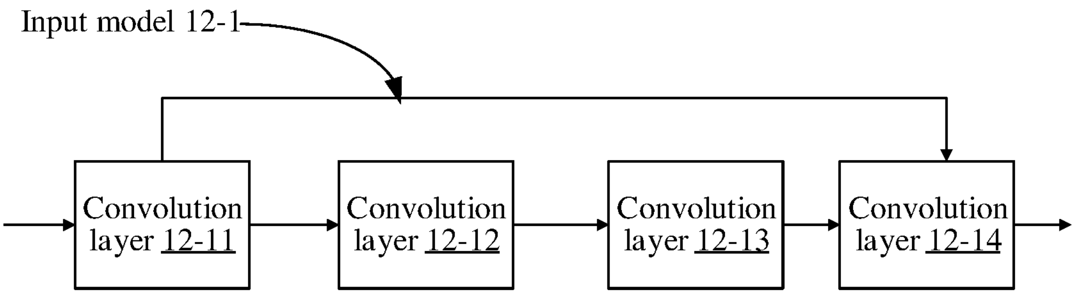
FIG. 12 is a schematic diagram of a topological structure of an input model according to certain embodiment(s) of the present disclosure.

Exemplarily, FIG. 12 is a schematic diagram of a topological structure of an input model according to an embodiment of the present disclosure. An input model 12-1 includes four convolution layers: a convolution layer 12-11 to a convolution layer 12-14. The output of the convolution layer 12-11 is connected to the inputs of the convolution layer 12-12 and the convolution layer 12-14. The output of the convolution layer 12-12 is connected to the input of the convolution layer 12-13. The output of the convolution layer 12-13 is connected to the input of the convolution layer 12-14.

Based on a topological structure shown in FIG. 12, the server may represent the input model as M={Conv1 $(w_i \in R^{out_1 \times in_1 \times k_1 \times k_1})$, Conv2$(w_2 \in R^{out_2 \times in_2 \times k_2 \times k_2})$ Conv3 $(w_3 \in R^{out_3 \times in_3 \times k_3 \times k_3})$, Conv4$(w_4 \in R^{out_4 \times in_4 \times k_4 \times k_4})$} (Con stands for the convolution layer). Since they are all connected, there is a relationship from formula (1) to formula (3):

$$out_1 = in_2 \tag{1}$$

$$out_1 = out_3 \tag{2}$$

$$out_1 = in_4 \tag{3}$$

where formula (1) and formula (3) are natural results caused by layering the structure of the DL model, while formula (2) is the constraint brought by a hop connection structure in the input model, which indicates that the number of output channels of Conv1 and Conv3 must be consistent, whereby Conv1 and Conv3 share a control parameter in the configuration of the search space. Based on this, the server will analyze the input model and obtain three groups (operator sets), namely {{Conv1, Conv3}, {Conv2}, {Conv4}} (it may be seen that the model operators in the same operator set have the same output operators). Given a sub-model configuration $s=\{0.25out_1, 0.5out_2, 0.75out_4\}$, the server will encapsulate the super-model to generate a new sub-model M'={Conv1$(w_1 \in R^{0.25out_1 \times in_1 \times k_1 \times k_1})$, Conv2 $(w_2 \in R^{0.5out_2 \times 0.25out_1 \times k_2 \times k_2})$, Conv3$(w_3 \in R^{0.25out_1 \times 0.5out_2 \times k_3 \times k_3})$, Conv4 $(w_4 \in R^{0.75out_4 \times 0.25out_1 \times k_4 \times k_4})$}, where the number of output channels of Conv1 and Conv3 is consistent, and determined by $s_1^1=0.25out_1$. That is to say, the server structurally analyzes the input model, that is, grouping the convolution layers according to the topological structure of the input model. The convolution layers in each group share a control parameter in a configuration of the search space (it may be seen that each operator set has a corresponding encapsulation variable, and the control parameter is used for assigning a value to the encapsulation variable). The control parameters sampled by different groups of convolution layers are different.

S203: Encapsulate a convolution operator obtained by analysis as an encapsulation operator.

The server encapsulates operators of the input model according to an operator group {{Conv1, Conv3}, {Conv2}, {Conv4}} obtained by structural analysis of the input model, and obtains operators {{Super1Conv1, Super1Conv3}, {Super2Conv2}, {Super3Conv4}}(encapsulation operators of model operators contained in each operator set). Super1 to Super3 are encapsulation parameters (encapsulation variables), and the encapsulated model is a super-model Super_M. A super-model 11-4 in FIG. 11 includes an encapsulation operator 11-41, an encapsulation operator 11-42, and an encapsulation operator 11-43.

The super-model Super_M may generate different sub-models Sub_M according to different configurations in the search space. That is, the configurations of the search space and the sub-models correspond one by one. It may be seen that the super-model is a set of dynamic models. If there are four different sub-model configuration parameters, four different sub-models may be obtained from the super-model. The property of the super-model is essentially brought by the encapsulation operator. The difference between the encapsulation operator and an ordinary convolution operator is that the input and output channel dimensions of the encapsulation operator may dynamically vary during training and reasoning. Each sub-model of the super-model shares position parameters corresponding to the super-model, which may improve the effect of the sub-model and increase the convergence speed of the sub-model.

S204: Copy the input model to obtain a teacher model.

In FIG. 11, the structure of a teacher model 11-5 is the same as that of the input model 11-1 and is formed by cascading the convolution layer 11-11 to the convolution layer 11-13. The main function of the teacher model is to constrain the adjustment process of learning features of different sub-models through knowledge distillation.

The knowledge distillation is a transfer learning method of the DL model. The purpose is to add parameter information of teacher model as prior information to the parameter update of the sub-model in the training process of the sub-model, whereby the sub-model has better generalization ability and reasoning effect, which may improve the effect of the sub-model and keep the consistency of features of different sub-models (different sub-models have different network structures, and if there is no constraint by the features of the teacher model, different sub-models will be adjusted in different directions, which makes it difficult for the super-model to converge to the optimal effect or even unable to converge).

Figure 13:
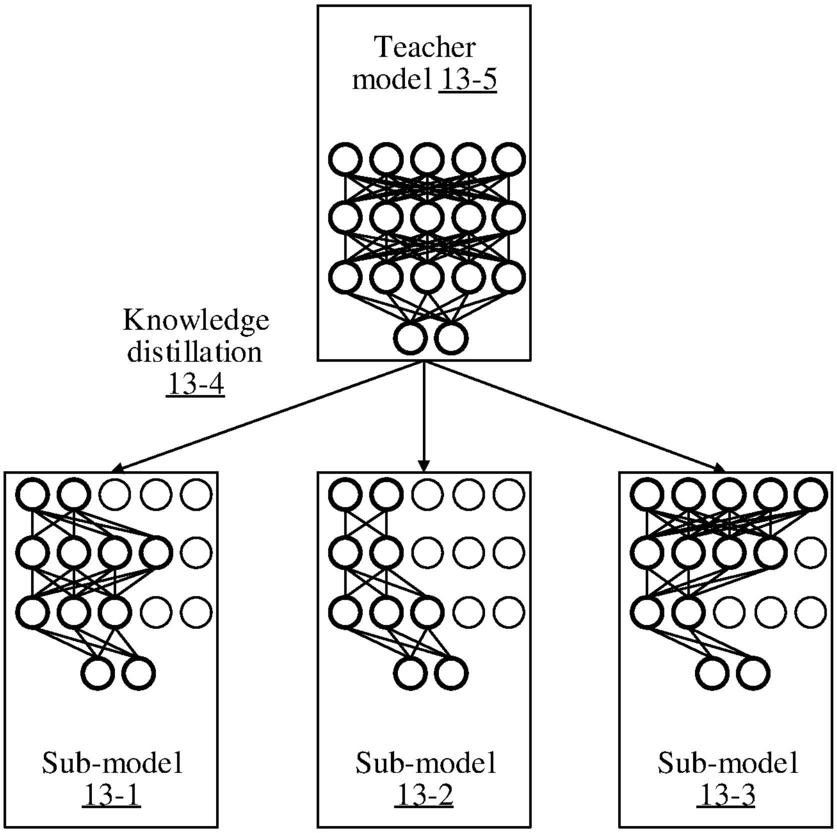
FIG. 13 is a schematic diagram of knowledge distillation according to certain embodiment(s) of the present disclosure.

Exemplarily, FIG. 13 is a schematic diagram of knowledge distillation according to an embodiment of the present disclosure. The server creates three different sub-models from the super-model Super_M using three different model configurations, namely a sub-model 13-1, a sub-model 13-2, and a sub-model 13-3. Then, during training, parameter information in a teacher model 13-5 is introduced into the parameter update of the three sub-models as prior information through knowledge distillation 13-4.

S205: Train a super-model to convergence.

The server may adjust the number of input channels of each convolution layer of the input model according to a manually-set super-parameter set A=[$a_1$%, . . . , $a_m$%] to obtain optional configuration information of each convolution layer (a plurality of updated structure parameters corresponding to each model operator), so as to determine the search space.

In each iteration of training, the server samples the search space once to obtain a sub-model configuration $s_t$ (model configuration information), obtains a corresponding sub-model Sub_$M_t$ (the sub-model corresponding to the model configuration information) from the super-model Super_M according to $s_t$, uses data (training data) of this iteration to perform forward reasoning and back propagation on the sub-model Sub_$M_t$, and updates parameters of the sub-model Sub_$M_t$ according to the gradient of back propagation to perform the iteration of the sub-model once. In fact, because the sub-model Sub_$M_t$ is a subset of the super-model Super_M, the iteration of the sub-model is performed once, that is, the iteration of the super-model Super_M is performed once. Moreover, in each iteration process, the teacher model is used for instructing the adjustment of all sub-models Sub_$M_t$. In FIG. 11, a super-model training process is shown by taking the training of the teacher model 11-5 for a sub-model 11-6 as an example. The sub-model 11-6 is obtained by assigning 0.5 to encapsulation parameters of the encapsulation operator 11-41 and the encapsulation operator 11-43 and 0.8 to an encapsulation parameter of the encapsulation operator 11-42.

S206: Perform model search on a trained convergence super-model.

After training, the server may obtain a convergence super-model Super_M, which is equivalent to a set of convergence sub-models. According to the given evaluation function 11-3, the server may search, by exhaustion or a planning algorithm, the super-model for a model with better performance, namely an optimal sub-model 11-7 in FIG. 11, to perform the model structure search, or search the super-model for a model with shorter reasoning time, namely a compressed model 11-8 in FIG. 11, to perform the model compression.

Hereinafter, the effect of the model adjustment method provided in this embodiment of the present disclosure will be explained by taking a super-resolution reconstruction task as an example.

After the input model obtains the corresponding compressed model through the model adjustment method in this embodiment of the present disclosure, the server performs super-resolution reconstruction on the same image by using the input model and the compressed model, and performs reconstruction effect comparison and performance index comparison during reconstruction.

Figure 14:
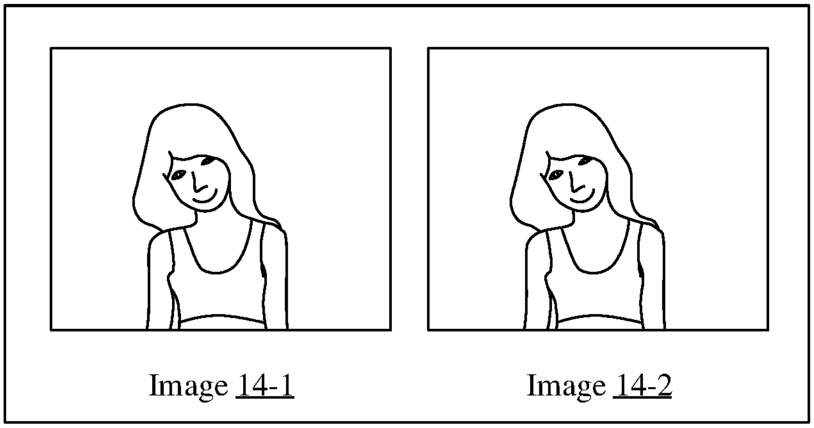
FIG. 14 is a schematic diagram of comparison between super-resolution reconstruction effects of an input model and a compressed model according to certain embodiment(s) of the present disclosure.

FIG. 14 is a diagram of comparison between super-resolution reconstrpossuction effects of an input model and a compressed model according to an embodiment of the present disclosure. An image 14-1 is obtained by super-resolution reconstruction based on an input model, and an image 14-2 is obtained by super-resolution reconstruction based on a compressed model. By comparing the image 14-1 and the image 14-2, it may be seen that there is almost no difference in the effect of super-resolution reconstruction between the input model and the compressed model.

Figure 15:
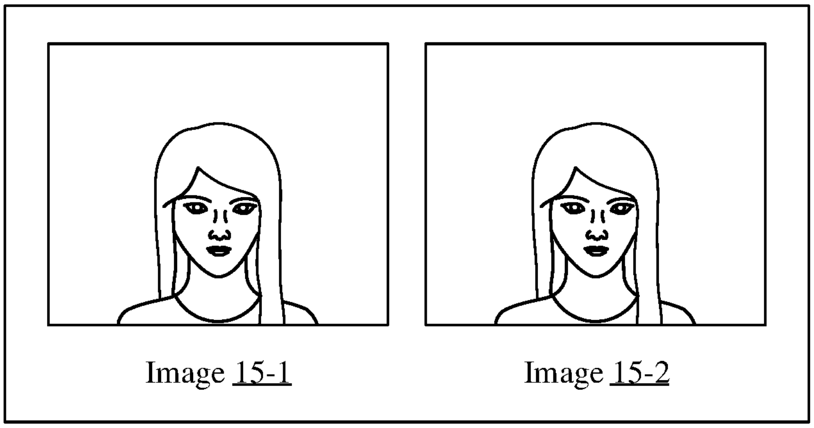
FIG. 15 is a schematic diagram of comparison between super-resolution reconstruction effects of an input model and a compressed model according to certain embodiment(s) of the present disclosure.

FIG. 15 is another diagram of comparison between super-resolution reconstruction effects of an input model and a compressed model according to an embodiment of the present disclosure. An image 15-1 is obtained by super-resolution reconstruction based on an input model, and an image 15-2 is obtained by super-resolution reconstruction based on a compressed model. There is almost no difference in the effect of super-resolution reconstruction between the image 15-1 and the image 15-2.

Table 1 is a comparison between super-resolution reconstruction performance indexes of an input model and a compressed model according to an embodiment of the present disclosure.

TABLE 1

| Model | Amount of access (GB) | Amount of computation (GFlops) | Amount of parameters (K) | PSNR |
|---|---|---|---|---|
| Input model | 3.53 | 93.54 | 1544 | 30.32 |
| Compressed model | 2.06(−58%) | 33.64(−64%) | 551(−64%) | 30.16(−0.5%) |

It may be seen from Table 1 that, compared with the input model, the amount of access occupied by the compressed model in a super-resolution reconstruction task is reduced by 58%, the amount of computation desired is reduced by 64%, and the amount of parameters is reduced by 64%, while the peak signal to noise ratio (PSNR) is only reduced by 0.5%, which is almost unchanged. It shows that the compressed model is almost the same as the input model in super-resolution reconstruction, but consumes fewer computing resources.

It is to be understood that training data relates to data relevant to photos of users in this embodiment of the present disclosure. When this embodiment of the present disclosure is applied to a particular product or technology, user approval or consent is desired, and collection, use and processing of the relevant data is desired to comply with relevant national and regional laws and regulations and standards.

An exemplary structure of the model adjustment apparatus 255 implemented as a software module according to an embodiment of the present disclosure is further described below. In some embodiments, as shown in FIG. 3, the software module stored in the model adjustment apparatus 255 of the memory 250 may include:

a data encapsulation module 2551, configured to encapsulate a model operator in a project model to obtain a super-model corresponding to the project model, the model operator at least including: a network layer in the project model, the super-model being a model with a dynamically variable space structure;

a space determination module 2552, configured to determine a configuration search space corresponding to the project model according to the model operator and a control parameter;

a model training module 2553, configured to train the super-model based on the configuration search space and the project model and obtain a convergence super-model corresponding to the project model in response to that a training end condition is reached; and a model search module 2554, configured to search the convergence super-model for an adjusted model corresponding to the project model.

In some embodiments of the present disclosure, the project model includes: the plurality of model operators. The data encapsulation module 2551 is further configured to: classify the plurality of model operators of the project model into at least one operator set according to a connection relationship between the plurality of model operators in the project model; allocate corresponding encapsulation variables for each operator set; encapsulate the model operators contained in each operator set using the encapsulation variable corresponding to each operator set, and obtain a plurality of encapsulation operators corresponding to the plurality of model operators upon completion of encapsulation, space structures of the encapsulation operators being variable; and connect the plurality of encapsulation operators according to the connection relationship between the plurality of model operators to obtain the super-model corresponding to the project model.

In some embodiments of the present disclosure, the data encapsulation module 2551 is further configured to: determine an output operator corresponding to each model operator according to the connection relationship between the plurality of model operators in the project model, input data of the output operators being output data of the model operators; and perform, according to the output operators, set classification on the plurality of model operators of the project model to obtain at least one operator set, the model operators in the same operator set having the same output operators.

In some embodiments of the present disclosure, the data encapsulation module 2551 is further configured to perform the encapsulation of the model operators contained in each operator set by fusing the encapsulation variable corresponding to each operator set and an output channel number of the model operators in each operator set.

In some embodiments of the present disclosure, the model adjustment apparatus 255 further includes: an operator combination module 2555, configured to: analytically obtain a convolution layer of the project model and an auxiliary network layer corresponding to the convolution layer from the project model, the auxiliary network layer at least including: a pooling layer and an activation layer; and combine the convolution layer and the auxiliary network layer corresponding to the convolution layer into the model operator.

In some embodiments of the present disclosure, the control parameter includes: a plurality of sub-model configuration parameters. The space determination module 2552 is further configured to: adjust a space structure parameter of each model operator using the plurality of sub-model configuration parameters to obtain a plurality of updated structure parameters corresponding to each model operator; determine a search vector constituted by the plurality of updated structure parameters corresponding to each model operator as a search vector of each model operator; and determine a search space constituted by the plurality of search vectors corresponding to the plurality of model operators as the configuration search space corresponding to the project model.

In some embodiments of the present disclosure, the model training module 2553 is further configured to: determine a copy of the project model as a teacher model; perform the following processing by iterating i, 1≤i≤N, N being a total number of iterations: sample the configuration search space for an $i^{th}$ time to obtain $i^{th}$ model configuration information; create a sub-model corresponding to the $i^{th}$ model configuration information from the super-model; train the sub-model based on the teacher model to obtain a convergence sub-model corresponding to the $i^{th}$ model configuration information; and determine, in response to that i is iterated to N, a set of the convergence sub-models corresponding to the N pieces of model configuration information as the convergence super-model.

In some embodiments of the present disclosure, the model training module 2553 is further configured to: determine a training loss value corresponding to the $i^{th}$ model configuration information based on a first prediction result of the sub-model for training data, a second prediction result of the teacher model for the training data, and tag information of the training data; and adjust a parameter of the sub-model using the training loss value corresponding to the $i^{th}$ model configuration information, and obtain the convergence sub-model corresponding to the $i^{th}$ model configuration information upon completion of parameter adjustment.

In some embodiments of the present disclosure, the model training module 2553 is further configured to: calculate a first difference value between the first prediction result of the sub-model for the training data and the tag information of the training data; calculate a second difference value between the first prediction result of the sub-model for the training data and the second prediction result of the teacher model for the training data; and determine a fusion result of the first difference information and the second difference information as the training loss value corresponding to the it model configuration information.

In some embodiments of the present disclosure, the model training module 2553 is further configured to: screen sub-models in the convergence super-model having a same prediction accuracy as a prediction accuracy of the project model to obtain an initial compressed model; and search sub-models in the initial compressed model having a prediction speed greater than a prediction speed of the project model for the adjusted model corresponding to the project model.

In some embodiments of the present disclosure, the model search module 2554 is further configured to: screen sub-models in the convergence super-model having the same prediction speed as the prediction speed of the project model to obtain an initial adjusted model; and search sub-models in the initial adjusted model having a prediction accuracy greater than a prediction accuracy of the project model for the adjusted model corresponding to the project model.

In some embodiments of the present disclosure, the model adjustment apparatus 255 further includes: a model application module 2556, configured to perform, in response to an image reconstruction request transmitted by a terminal device for a to-be-reconstructed image, super-resolution reconstruction on the to-be-reconstructed image using the adjusted model to obtain a super-resolution image of the to-be-reconstructed image, and return the super-resolution image to the terminal device.

In some embodiments of the present disclosure, the model application module 2556 is further configured to perform, in response to an image classification request transmitted by a terminal device for a to-be-classified image, image classification on the to-be-classified image using the adjusted model to obtain classification information of the to-be-classified image, and return the classification information to the terminal device.

This embodiment of the present disclosure provides a computer program product or computer program. The computer program product or computer program includes computer instructions. The computer instructions are stored in a computer-readable storage medium. A processor of an electronic device reads the computer instructions from the computer-readable storage medium. The processor executes the computer instructions, whereby the electronic device performs the model adjustment method according to this embodiment of the present disclosure.

This embodiment of the present disclosure provides a computer-readable storage medium storing executable instructions. The executable instructions are stored therein. When executed by a processor, the executable instructions may trigger the processor to perform the model adjustment method according to this embodiment of the present disclosure, for example, the model adjustment method shown in FIG. 4.

In some embodiments, the computer-readable storage medium may be a memory such as FRAM, ROM, PROM, EPROM, EEPROM, flash memory, magnetic surface memory, optical disc, or CD-ROM. Various devices including one or any combination of the memories are also possible.

In some embodiments, the executable instructions may take the form of program, software, software module, script, or code, may be written in any form of programming language (including compiled or interpreted languages, or declarative or procedural languages), and may be deployed in any form, including as a stand-alone program or as a module, component, subroutine, or another unit suitable for use in a computing environment.

By way of example, the executable instructions may, but may not, correspond to files in a file system, and may be stored in a portion of a file that stores other programs or data, for example, in one or more scripts in a hyper text markup language (HTML) document, in a single file dedicated to the program in question, or in a plurality of coordinated files (for example, files that store one or more modules, subroutines, or portions of code).

By way of example, the executable instructions may be deployed to be executed on one electronic device, or on a plurality of electronic devices located at one site, or on a plurality of electronic devices distributed across a plurality of sites and interconnected by a communication network.

In certain embodiment(s), an electronic device obtains a super-model that has a dynamically variable space structure and may provide models with different structures by encapsulating a model operator, and trains the super-model by configuring a search space and a project model, thereby obtaining, by only one training, a convergent super-model available for searching for a model with better performance, reducing model trainings for generating an optional model, and also reducing computing resources consumed during model adjustment. Also, in view of different service desirables, only a corresponding adjusted model may be extracted directly from the convergence super-model, and additional model trainings are not desired, thereby improving the efficiency of model adjustment. Based on the same convergence super-model, model structure compression and model structure search may be realized, and model trainings for model structure compression and model structure search are not desired, whereby model adjustment is more versatile and easier to deploy to practical implementation scenes.

The descriptions are merely embodiments of the present disclosure and are not intended to limit the protection scope of the present disclosure. Any modification, equivalent replacement, or improvement made without departing from the spirit and principle of the present disclosure fall within the protection scope of the present disclosure.

What is claimed is:

1. A model adjustment method, performed by an electronic device, the method comprising:

encapsulating a model operator in a project model to obtain a super-model corresponding to the project model, the model operator at least including: a network layer in the project model, the super-model being a model with a dynamically variable space structure;

determining a configuration search space corresponding to the project model according to the model operator and a control parameter;

training the super-model based on the configuration search space and the project model and obtaining a convergence super-model corresponding to the project model in response to that a training end condition is reached, comprising:

determining a copy of the project model as a teacher model;

performing the following processing by iterating i, 1≤i≤N, N being a total number of iterations:

sampling the configuration search space for an $i^{th}$ time to obtain $i^{th}$ model configuration information;

creating a sub-model corresponding to the $i^{th}$ model configuration information from the super-model; and training the sub-model based on the teacher model by performing parameter adjustment using a training loss value, and obtaining a convergence sub-model corresponding to the $i^{th}$ model configuration information upon completion of the parameter adjustment; and determining, in response to that i is iterated to N, a set of the convergence sub-models corresponding to the N pieces of model configuration information as the convergence super-model; and searching the convergence super-model for an adjusted model corresponding to the project model.

2. The method according to claim 1, wherein the project model includes the plurality of model operators, and encapsulating the model operator comprises:

classifying the plurality of model operators of the project model into at least one operator set according to a connection relationship between the plurality of model operators in the project model;

allocating corresponding encapsulation variables for each operator set;

encapsulating the model operators contained in each operator set using the encapsulation variable corresponding to each operator set, and obtaining a plurality of encapsulation operators corresponding to the plurality of model operators upon completion of encapsulation, space structures of the encapsulation operators being dynamically variable; and connecting the plurality of encapsulation operators according to the connection relationship between the plurality of model operators to obtain the super-model corresponding to the project model.

3. The method according to claim 2, wherein classifying the plurality of model operators comprises:

determining an output operator corresponding to each model operator according to the connection relationship between the plurality of model operators in the project model, input data of the output operators being output data of the model operators; and performing, according to the output operators, set classification on the plurality of model operators of the project model to obtain at least one operator set, the model operators in the same operator set having the same output operators.

4. The method according to claim 2, wherein encapsulating the model operators comprises:

performing the encapsulation of the model operators contained in each operator set by fusing the encapsulation variable corresponding to each operator set and an output channel number of the model operators in each operator set.

5. The method according to claim 2, further comprising:

analytically obtaining a convolution layer of the project model and an auxiliary network layer corresponding to the convolution layer from the project model, the auxiliary network layer at least including: a pooling layer and an activation layer; and combining the convolution layer and the auxiliary network layer corresponding to the convolution layer into the model operator.

6. The method according to claim 2, wherein the control parameter includes a plurality of sub-model configuration parameters, and determining the configuration search space comprises:

adjusting a space structure parameter of each model operator using the plurality of sub-model configuration parameters to obtain a plurality of updated structure parameters corresponding to each model operator;

determining a vector constituted by the plurality of updated structure parameters corresponding to each model operator as a search vector of each model operator; and determining a search space constituted by the plurality of search vectors corresponding to the plurality of model operators as the configuration search space corresponding to the project model.

7. The method according to claim 1, wherein training the sub-model comprises:

determining the training loss value corresponding to the $i^{th}$ model configuration information based on a first prediction result of the sub-model for training data, a second prediction result of the teacher model for the training data, and tag information of the training data; and adjusting a parameter of the sub-model using the training loss value corresponding to the $i^{th}$ model configuration information, and obtaining the convergence sub-model corresponding to the $i^{th}$ model configuration information upon completion of parameter adjustment.

8. The method according to claim 7, wherein determining the training loss value comprises:

calculating a first difference value between the first prediction result of the sub-model for the training data and the tag information of the training data;

calculating a second difference value between the first prediction result of the sub-model for the training data and the second prediction result of the teacher model for the training data; and determining a fusion result of the first difference information and the second difference information as the training loss value corresponding to the $i^{th}$ model configuration information.

9. The method according to claim 1, wherein searching the convergence super-model comprises:

screening sub-models in the convergence super-model having a same prediction accuracy as a prediction accuracy of the project model to obtain an initial compressed model; and searching sub-models in the initial compressed model having a prediction speed greater than a prediction speed of the project model for the adjusted model corresponding to the project model.

10. The method according to claim 1, wherein searching the convergence super-model comprises:

screening sub-models in the convergence super-model having the same prediction speed as the prediction speed of the project model to obtain an initial adjusted model; and searching sub-models in the initial adjusted model having a prediction accuracy greater than a prediction accuracy of the project model for the adjusted model corresponding to the project model.

11. The method according to claim 1, further comprising:

performing, in response to an image reconstruction request transmitted by a terminal device for a to-be-reconstructed image, super-resolution reconstruction on the to-be-reconstructed image using the adjusted model to obtain a super-resolution image of the to-be-reconstructed image, and returning the super-resolution image to the terminal device.

12. The method according to claim 1, further comprising:

performing, in response to an image classification request transmitted by a terminal device for a to-be-classified image, image classification on the to-be-classified image using the adjusted model to obtain classification information of the to-be-classified image, and returning the classification information to the terminal device.

13. A model adjustment apparatus, comprising: a memory storing computer program instructions; and a processor coupled to the memory and configured to execute the computer program instructions and perform:

encapsulating a model operator in a project model to obtain a super-model corresponding to the project model, the model operator at least including: a network layer in the project model, the super-model being a model with a dynamically variable space structure;

determining a configuration search space corresponding to the project model according to the model operator and a control parameter;

training the super-model based on the configuration search space and the project model and obtaining a convergence super-model corresponding to the project model in response to that a training end condition is reached, comprising:

determining a copy of the project model as a teacher model;

performing the following processing by iterating i, $1 \le i \le N$, N being a total number of iterations:

sampling the configuration search space for an $i^{th}$ time to obtain $i^{th}$ model configuration information;

creating a sub-model corresponding to the $i^{th}$ model configuration information from the super-model; and training the sub-model based on the teacher model by performing parameter adjustment using a training loss value, and obtaining a convergence sub-model corresponding to the $i^{th}$ model configuration information upon completion of the parameter adjustment; and determining, in response to that i is iterated to N, a set of the convergence sub-models corresponding to the N pieces of model configuration information as the convergence super-model; and searching the convergence super-model for an adjusted model corresponding to the project model.

14. The apparatus according to claim 13, wherein the project model includes the plurality of model operators, and encapsulating the model operator includes:

classifying the plurality of model operators of the project model into at least one operator set according to a connection relationship between the plurality of model operators in the project model;

allocating corresponding encapsulation variables for each operator set;

encapsulating the model operators contained in each operator set using the encapsulation variable corresponding to each operator set, and obtaining a plurality of encapsulation operators corresponding to the plurality of model operators upon completion of encapsulation, space structures of the encapsulation operators being dynamically variable; and connecting the plurality of encapsulation operators according to the connection relationship between the plurality of model operators to obtain the super-model corresponding to the project model.

15. The apparatus according to claim 13, wherein searching the convergence super-model includes:

screening sub-models in the convergence super-model having a same prediction accuracy as a prediction accuracy of the project model to obtain an initial compressed model; and searching sub-models in the initial compressed model having a prediction speed greater than a prediction speed of the project model for the adjusted model corresponding to the project model.

16. The apparatus according to claim 13, wherein searching the convergence super-model includes:

screening sub-models in the convergence super-model having the same prediction speed as the prediction speed of the project model to obtain an initial adjusted model; and searching sub-models in the initial adjusted model having a prediction accuracy greater than a prediction accuracy of the project model for the adjusted model corresponding to the project model.

17. The apparatus according to claim 13, wherein the processor is further configured to execute the computer program instructions and perform:

performing, in response to an image reconstruction request transmitted by a terminal device for a to-be-reconstructed image, super-resolution reconstruction on the to-be-reconstructed image using the adjusted model to obtain a super-resolution image of the to-be-reconstructed image, and returning the super-resolution image to the terminal device.

18. The apparatus according to claim 13, wherein the processor is further configured to execute the computer program instructions and perform:

performing, in response to an image classification request transmitted by a terminal device for a to-be-classified image, image classification on the to-be-classified image using the adjusted model to obtain classification information of the to-be-classified image, and returning the classification information to the terminal device.

19. A non-transitory computer-readable storage medium storing computer program instructions executable by at least one processor to perform:

encapsulating a model operator in a project model to obtain a super-model corresponding to the project model, the model operator at least including: a network layer in the project model, the super-model being a model with a dynamically variable space structure;

determining a configuration search space corresponding to the project model according to the model operator and a control parameter;

training the super-model based on the configuration search space and the project model and obtaining a convergence super-model corresponding to the project model in response to that a training end condition is reached, comprising:

determining a copy of the project model as a teacher model;

performing the following processing by iterating i, 1≤i≤N, N being a total number of iterations:

sampling the configuration search space for an $i^{th}$ time to obtain $i^{th}$ model configuration information;

creating a sub-model corresponding to the $i^{th}$ model configuration information from the super-model; and training the sub-model based on the teacher model by performing parameter adjustment using a training loss value, and obtaining a convergence sub-model corresponding to the $i^{th}$ model configuration information upon completion of the parameter adjustment; and determining, in response to that i is iterated to N, a set of the convergence sub-models corresponding to the N pieces of model configuration information as the convergence super-model; and searching the convergence super-model for an adjusted model corresponding to the project model.

* * * * *